No. 880,034. PATENTED FEB. 25, 1908.
R. H. & W. A. McNAIR.
ADDING MACHINE.
APPLICATION FILED APR. 1, 1907.
12 SHEETS—SHEET 1.
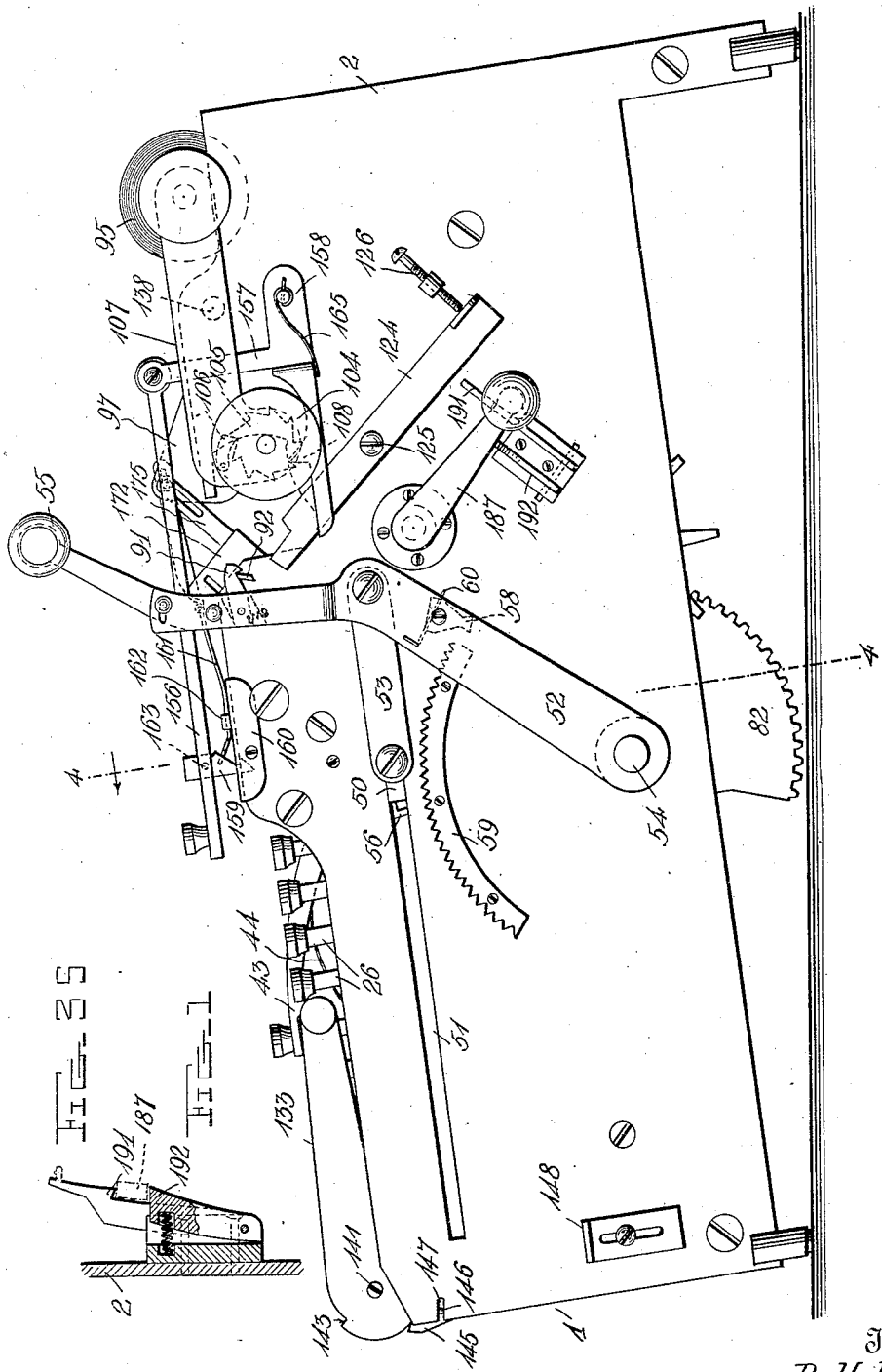
Witnesses
C. ~~~~
C. H. Griesbauer
Inventors
R. H. McNair
and W. A. McNair
by H. B. Willson &co
Attorneys

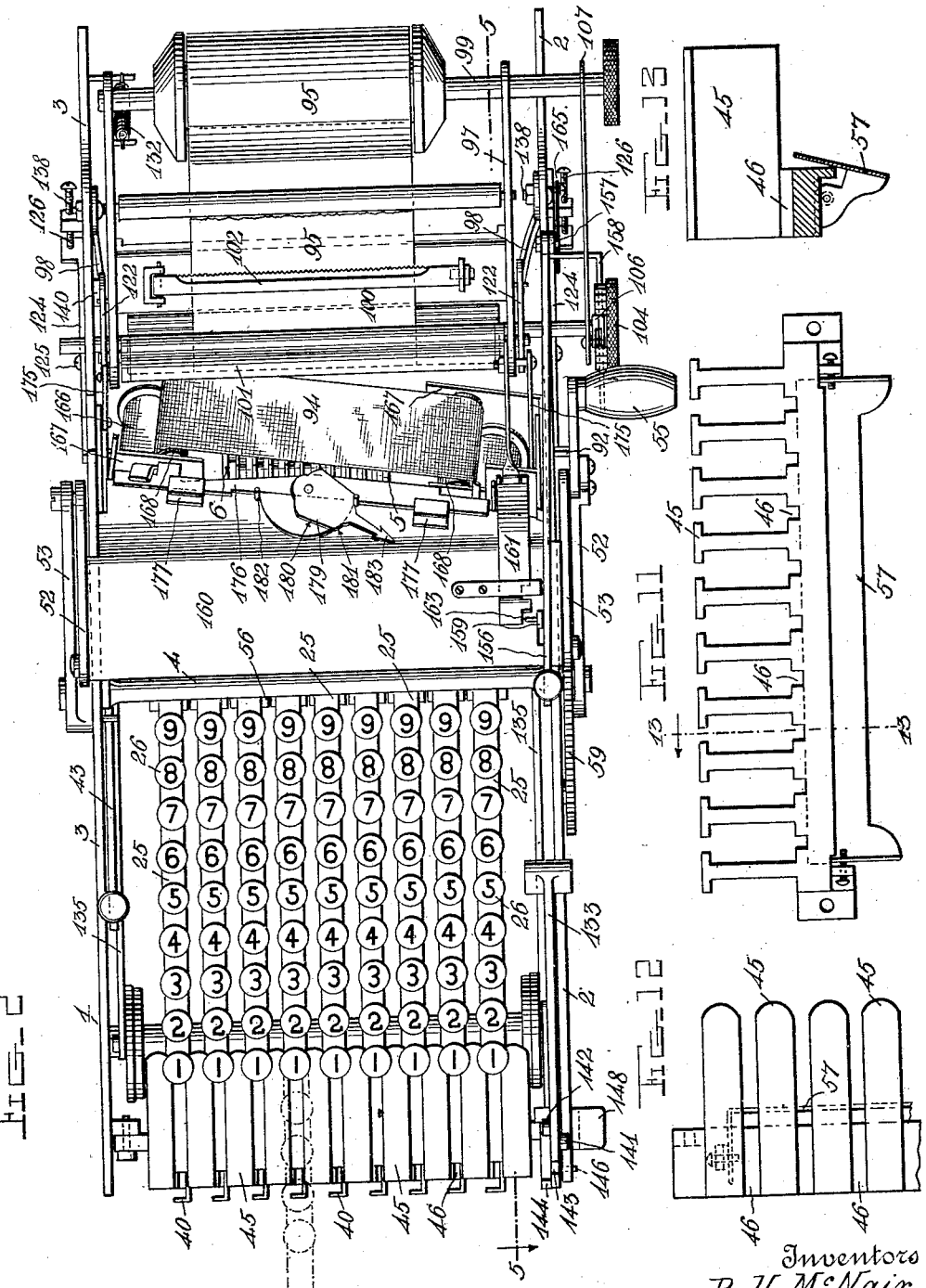

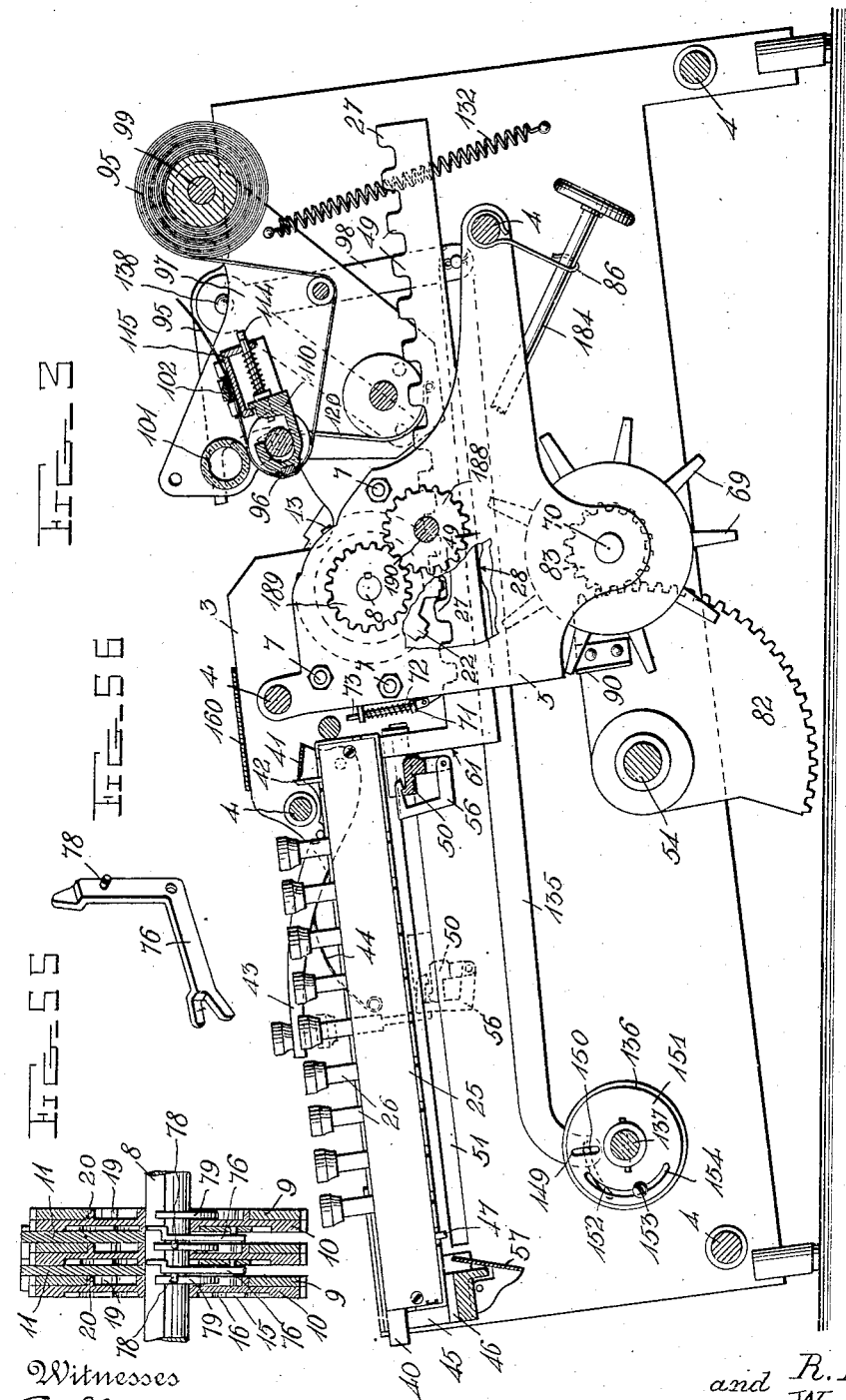

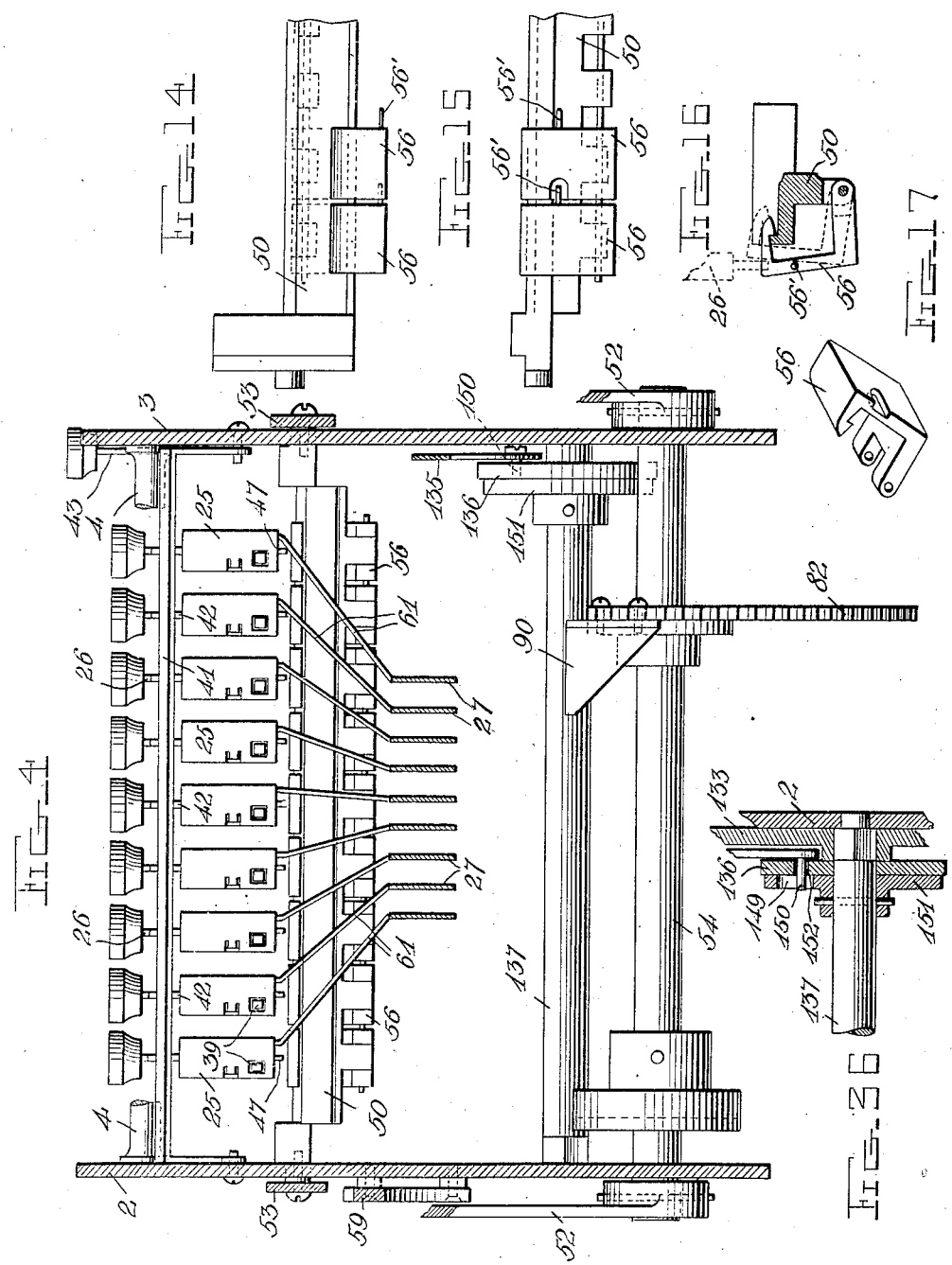

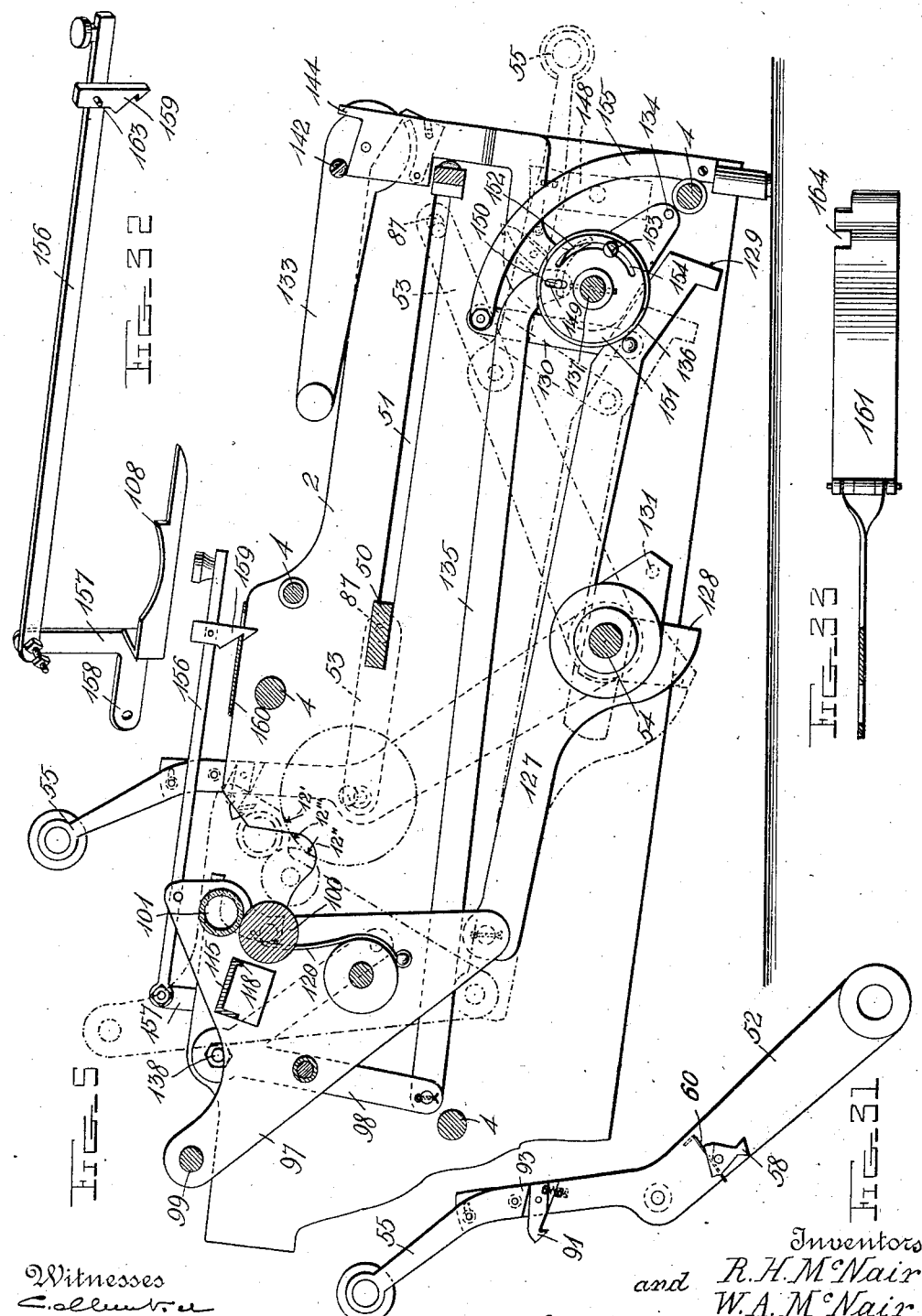

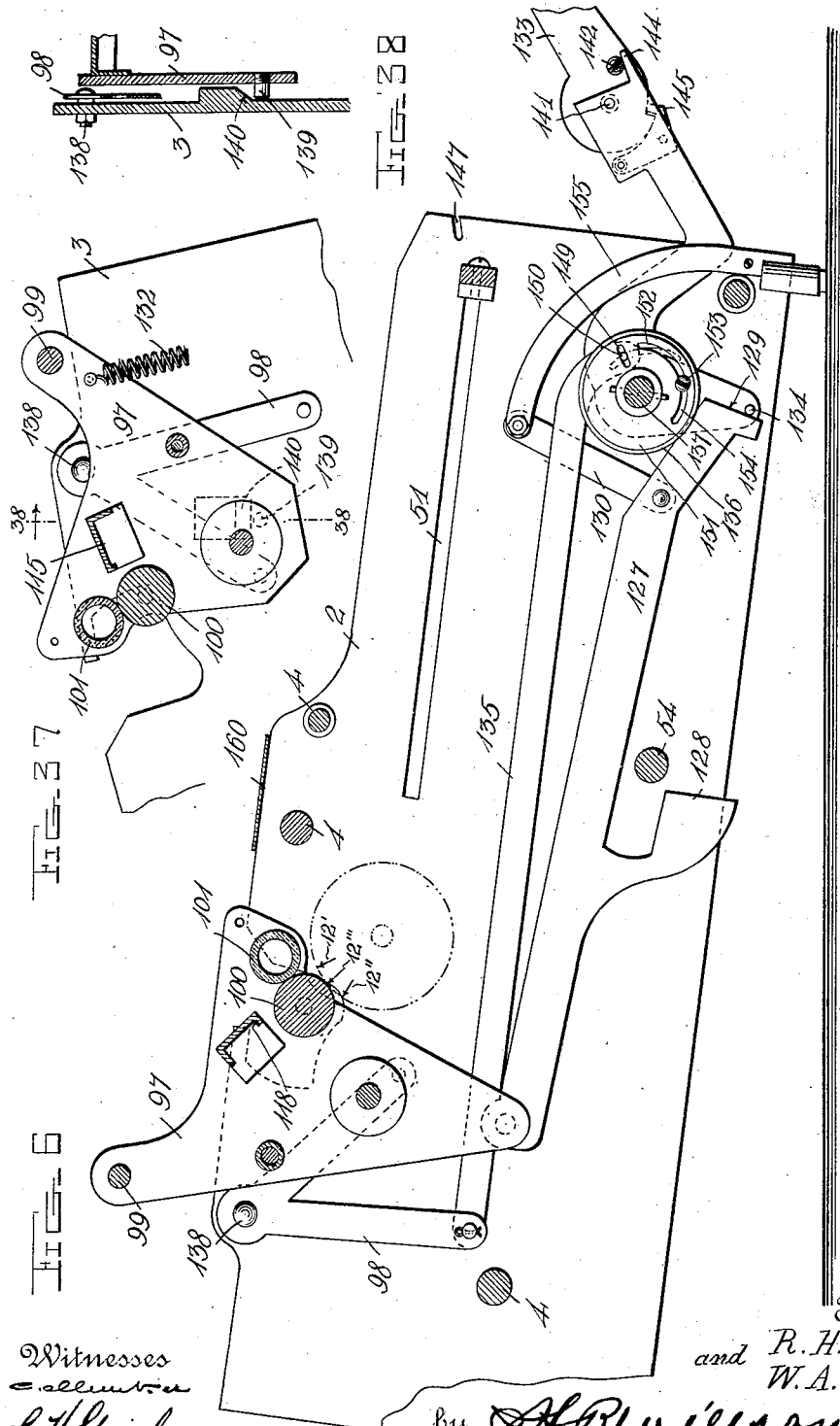

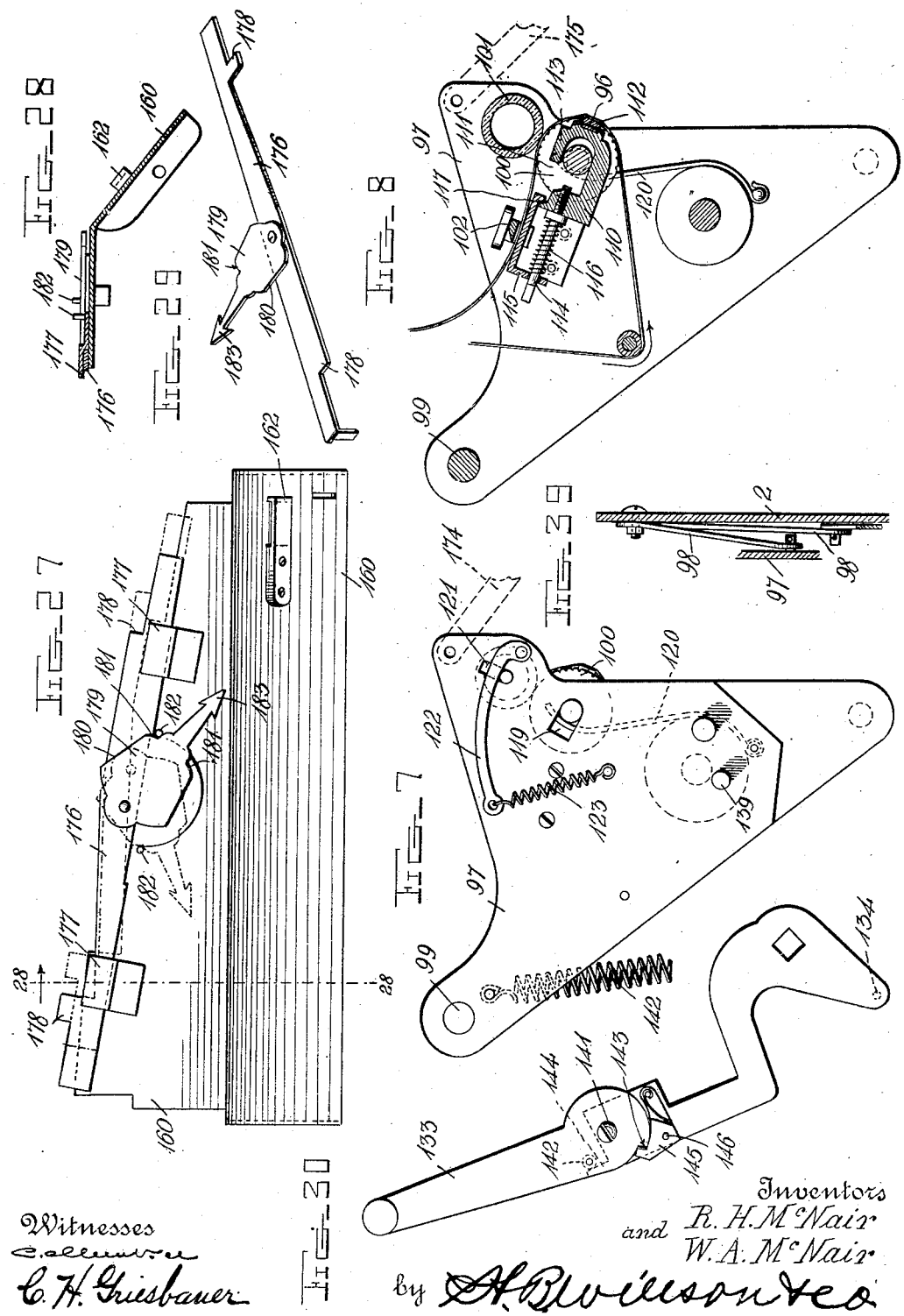

No. 880,034. PATENTED FEB. 25, 1908.
R. H. & W. A. McNAIR.
ADDING MACHINE.
APPLICATION FILED APR. 1, 1907.
12 SHEETS—SHEET 8.
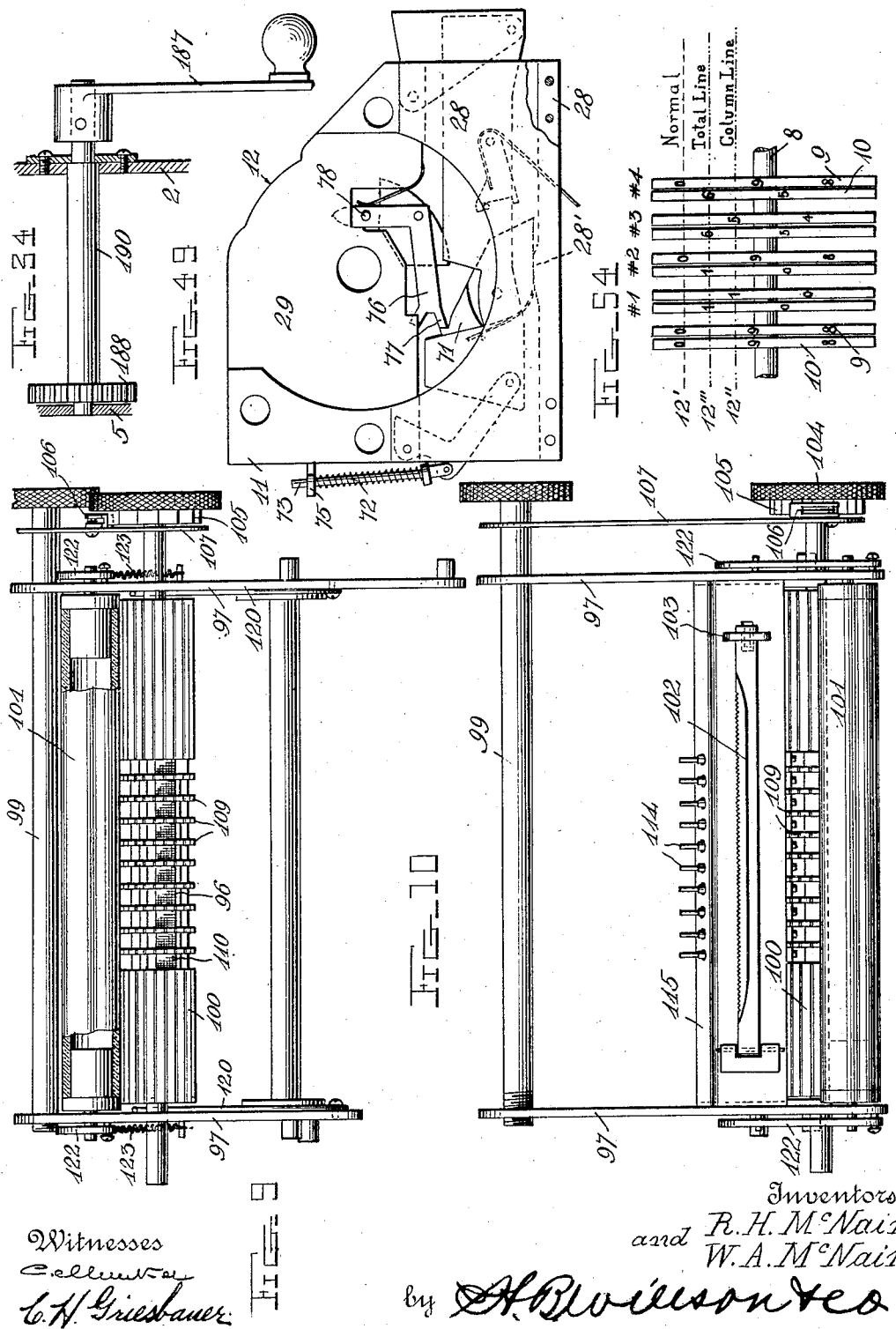
Witnesses
Inventors
R. H. McNair
and
W. A. McNair
by
Attorneys

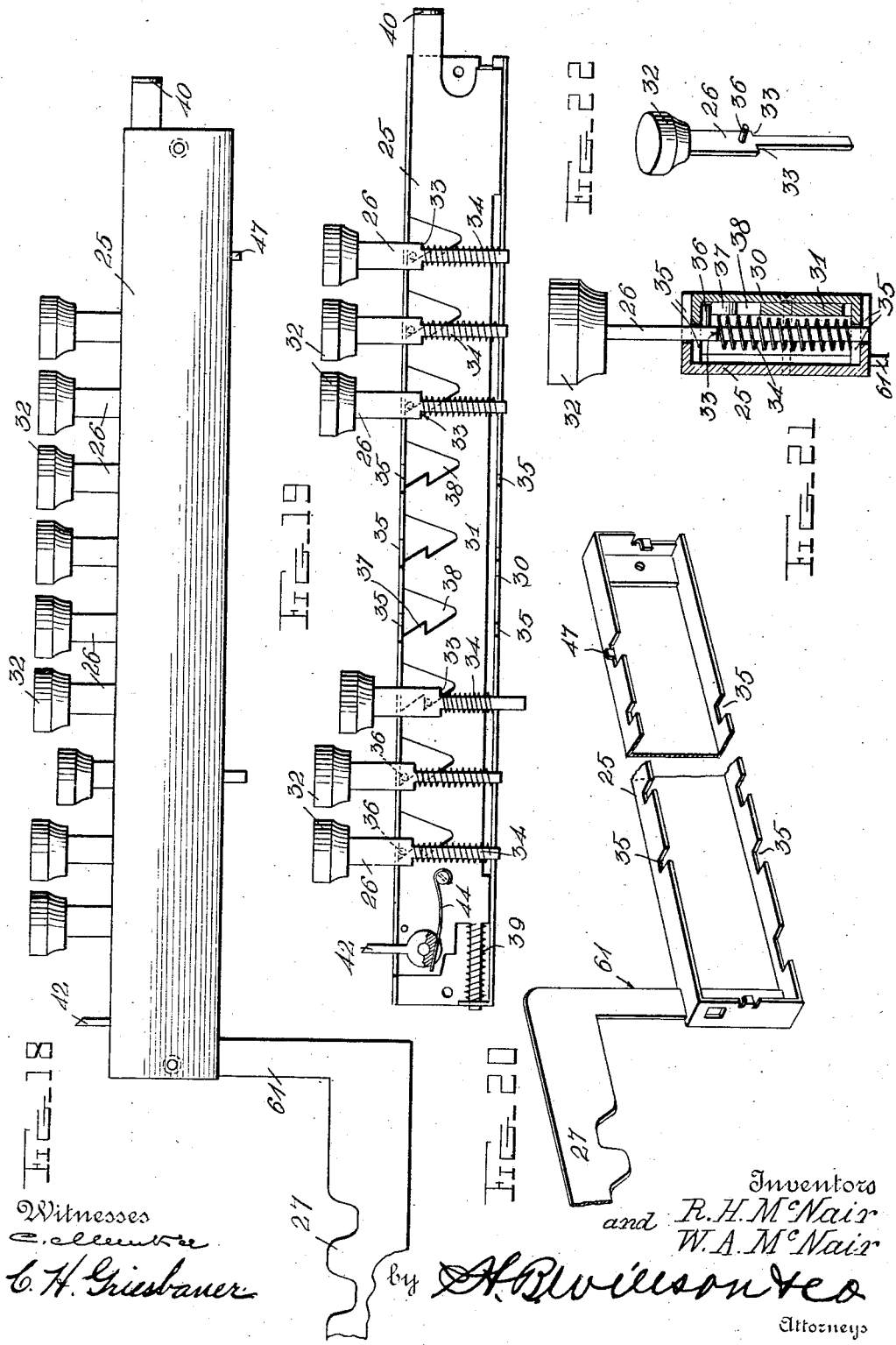

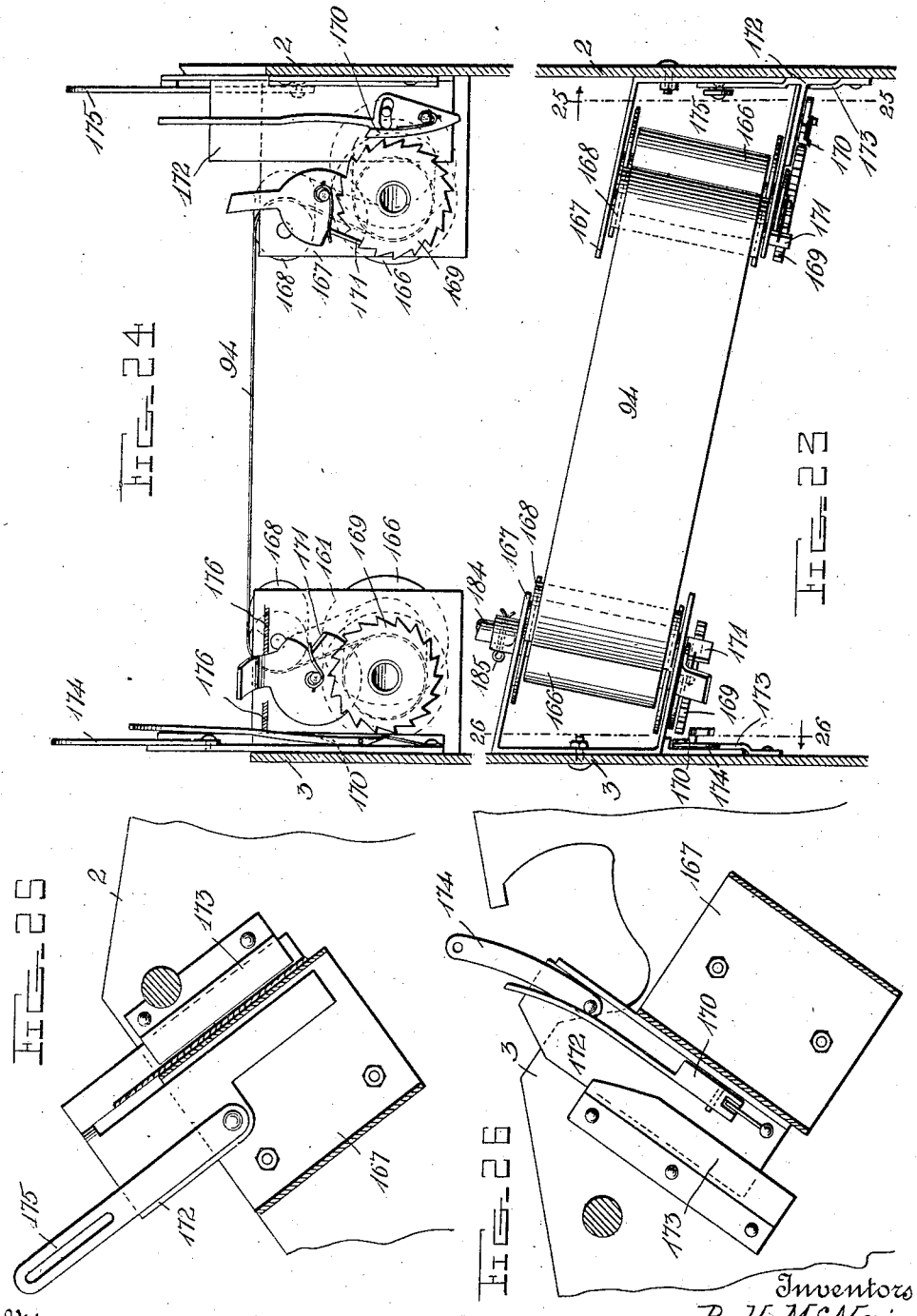

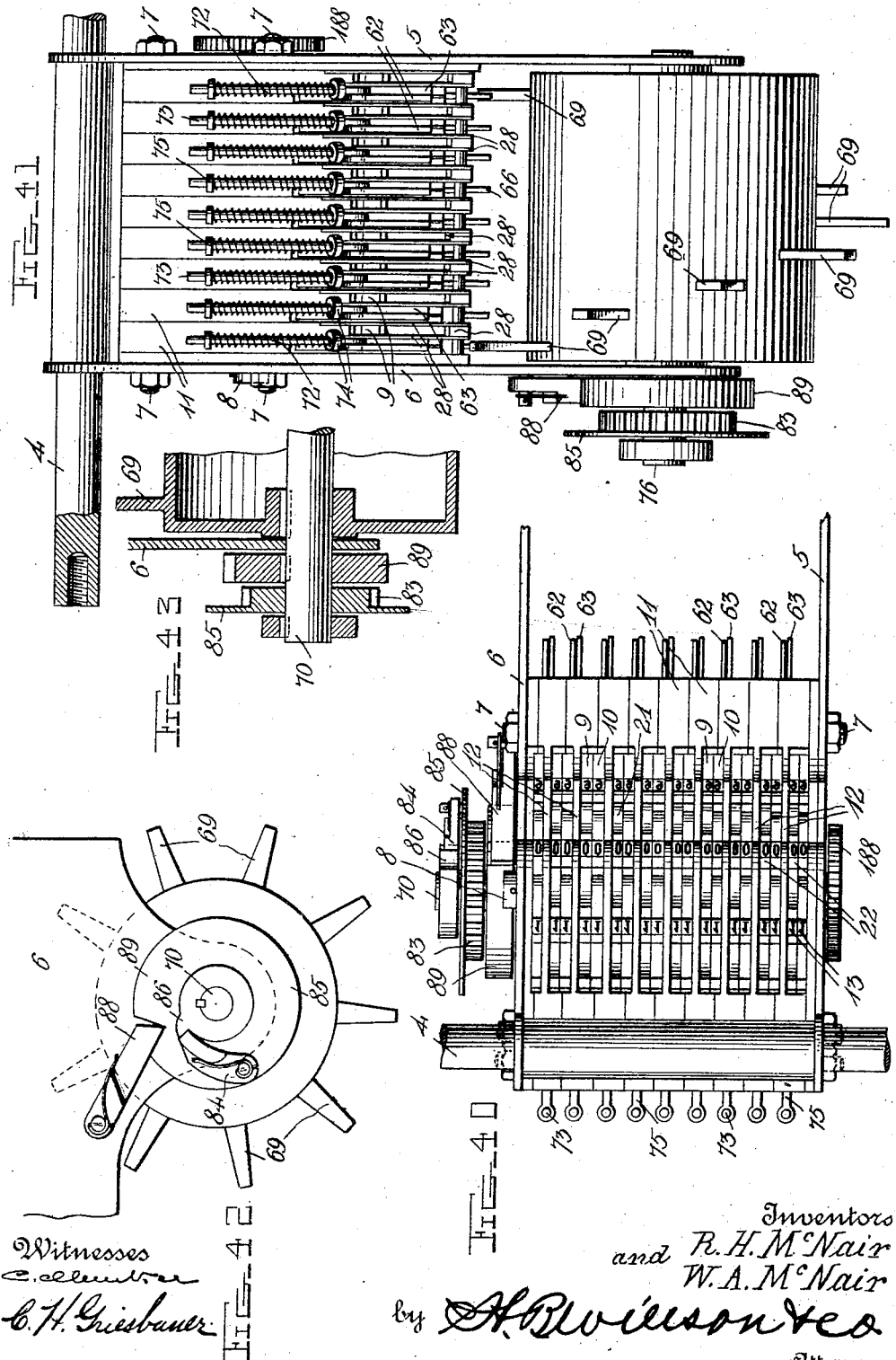

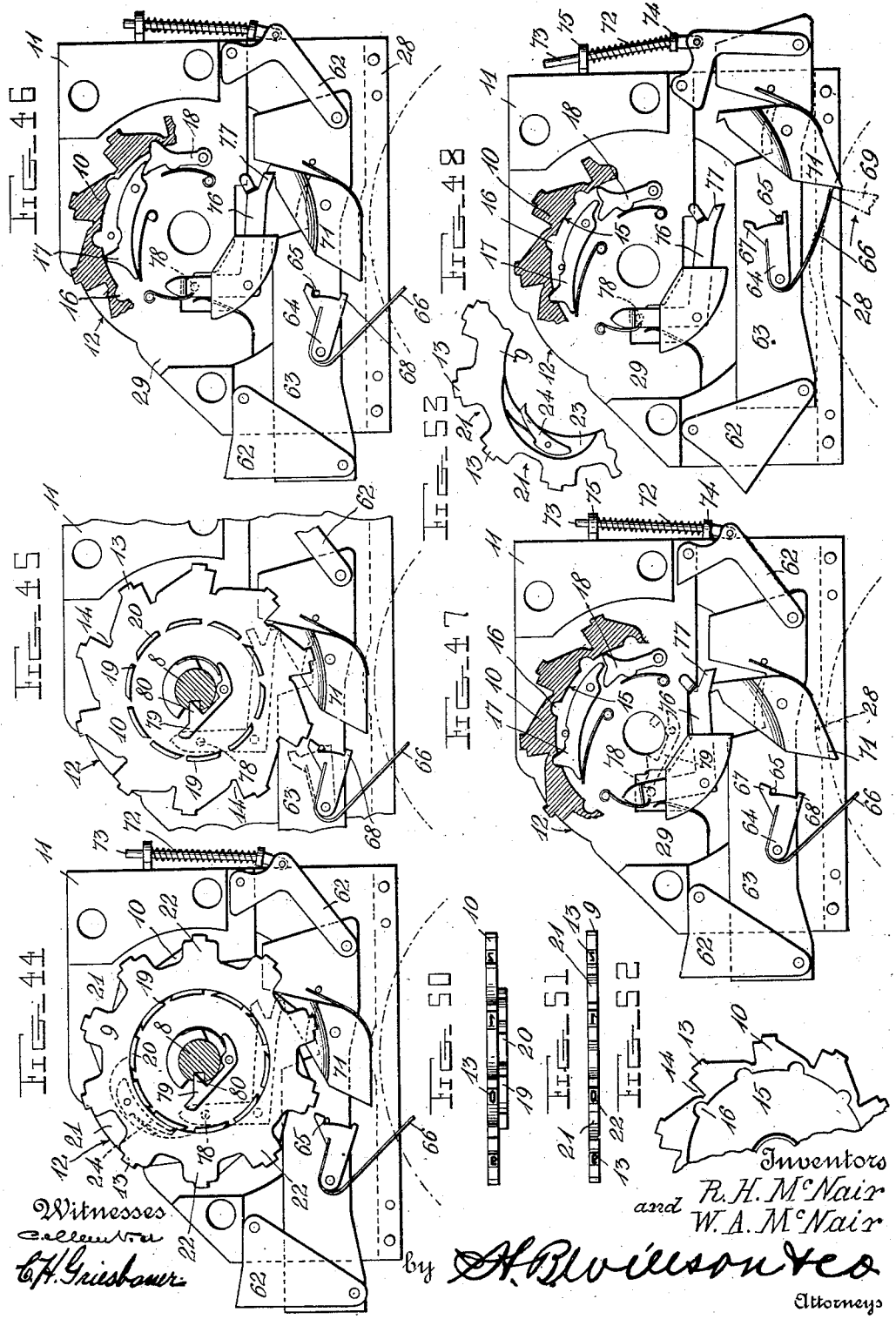

UNITED STATES PATENT OFFICE.

ROBERT H. McNAIR AND WILLIAM A. McNAIR, OF PEORIA, ILLINOIS.

ADDING-MACHINE.

No. 880,034.      Specification of Letters Patent.      Patented Feb. 25, 1908.

Application filed April 1, 1907. Serial No. 365,831.

*To all whom it may concern:*

Be it known that we, ROBERT H. McNAIR and WILLIAM A. McNAIR, citizens of the United States, residing at Peoria, in the county of Peoria and State of Illinois, have invented certain new and useful Improvements in Adding-Machines; and we do declare the following to be a full, clear, and exact description of the invention, such as will enable others skilled in the art to which it appertains to make and use the same.

This invention relates to adding machines, and has for its object to provide a device of this kind in which any desired number of figures or amounts may be quickly and accurately added and recorded, and also in which the sum total or the result can be registered and recorded either at the termination of the addition or at any time during the process of the addition.

Another object of the invention is to accomplish these results expeditiously with the use of a comparatively few number of parts, and having these parts as simple as possible and many of them substantially, if not exact, duplicates of the others.

Another object is to prevent an error being made when more than one actuating key is depressed, and also to prevent the possibility of a partial depression of any of the actuating keys.

Another object is having the printed result of the operation of the machine in sight at all times, and also the ability of taking or printing the result of the addition at any time without changing the relative positions of the parts of the machine, as by printing said result upon a separate piece of paper.

Another advantage is the ability to secure and always maintain evenness of pressure in making the imprint from the type, and, still another advantage is the evenness of the wear upon the type ribbon, whereby the life of the ribbon is extended and a uniformity of impression is secured.

In the accompanying drawings, which illustrate the invention, Figure 1 is a side elevation of the machine; Fig. 2 is a top plan view; Fig. 3 is a longitudinal sectional view; Fig. 4 is a cross sectional view on the line 4—4 of Fig. 1; Fig. 5 is a longitudinal sectional view on line 5—5 of Fig. 2, showing the printing frame in two positions for printing the columns; Fig. 6 is a similar view showing the printing frame in position for printing the total; Fig. 7 is an end elevation of the printing frame; Fig. 8 is a cross sectional view of said frame; Fig. 9 is a front elevation of the same; Fig. 10 is a top plan view of the same; Fig. 11 is a front view of the key board support; Fig. 12 is a broken top plan view of the same; Fig. 13 is a cross sectional view on line 13—13 of Fig. 11; Fig. 14 is a broken top plan view of the draw bar; Fig. 15 is a broken front elevation thereof; Fig. 16 is a cross sectional view of said bar; Fig. 17 is a perspective view of one of the gravity pawls; Fig. 18 is a side elevation of one of the key frames; Fig. 19 is a side elevation of one part of the key frame; Fig. 20 is a broken perspective view of the other part of said frame; Fig. 21 is a cross sectional view through the casing of the key frame; Fig. 22 is a perspective view of one of the keys; Fig. 23 is a top plan view of the ribbon feed; Fig. 24 is a side elevation of said mechanism; Fig. 25 is a cross sectional view on line 25—25 of Fig. 23; Fig. 26 is a cross sectional view on line 26—26 of Fig. 23; Fig. 27 is a top plan view of the ribbon shifting mechanism showing the same in two positions; Fig. 28 is a cross sectional view on the line 28—28 of Fig. 27; Fig. 29 is a perspective view of the ribbon shifting bar; Fig. 30 is a side elevation of the total printing lever; Fig. 31 is a side elevation of the column printing lever; Fig. 32 is a perspective view of the non-feeding device for the paper; Fig. 33 is a top plan view of the release for the same; Fig. 34 is a detail view of the clearing mechanism; Fig. 35 is a sectional view of the lock for the same; Fig. 36 is a sectional view of a part of the mechanism for regulating the total printing; Fig. 37 is a broken inside elevation of part of one side of the main frame of the machine; Fig. 38 is a sectional view on line 38—38 of Fig. 37; Fig. 39 is a broken sectional view showing one of the hangers; Fig. 40 is a top plan view of the registering mechanism; Fig. 41 is a rear view thereof; Fig. 42 is a broken side elevation of the lower portion thereof; Fig. 43 is a longitudinal sectional view of one end of the conveyer; Fig. 44 is a side elevation of one of the division plates; Fig. 45 is a similar view with the column disk removed; Fig. 46 is a similar view with both disks removed; Fig. 47 is a similar view of the same with the parts in a different position; Fig. 48 is a similar view with the parts in still another position; Fig. 49 is an elevation of said plate from the other side; Fig. 50 is an edge view of the total disk; Fig. 51 is a similar view of the column disk; and Figs. 52 and 53 are broken side elevations of said disks; Fig. 54 is a diagrammatic view of the registering disks in their different positions; Fig. 55 is a sectional view across a portion of the disks and partitions; Fig. 56 is a perspective view of one of the levers for controlling the movements of the carrying disk.

Referring more particularly to the drawings, 1 indicates the frame of the machine, which may be of any desired size and shape, but is preferably formed from vertically arranged side pieces, 2 and 3, secured together by transverse cross pieces, 4.

Rigidly secured within the frame, as by means of two plates, 5 and 6, is the registering mechanism; said plates being secured or positioned upon two of the cross pieces, 4 See Figs. 3 and 40. The plates are rigidly spaced apart by means of bolts, 7, and a shaft, 8, is journaled therein, upon which are mounted the registering disks, 9 and 10, said disks being preferably arranged in pairs, one of which as 9 is the column disk and the other one 10 is the total or accumulator disk. Arranged between the pairs of disks are division plates, 11, which are also secured upon the bolts, 7, and each is cut away at one edge as at 12, to permit of the type or characters, 13, on said disks projecting far enough to make an imprint or record when the recording mechanism is actuated.

The characters on the two disks normally stand side-by-side or in line with each other, with their zeros on what we shall call the "normal" line, as shown at 12' in Fig. 54. When the disks have been actuated, their characters will be moved forward until they stand at the "total" and "column" lines, 12''' and 12'', respectively. This arrangement of the disks will permit of the forward movement of the printing mechanism without a record being made before the machine has been actuated, for the reason that the two printing points or lines are between two of the characters when the disks are in their normal or unactuated positions.

The periphery of the total disk is provided with teeth or shoulders formed by recessing the same as shown at 14, in Figs. 45 and 52 one of the shoulders being preferably substantially radial, and the other one inclined. The face of the disk which lies against the plate, 11, is recessed as shown at 15 in Fig. 55 and provided with a series of smaller recesses, or indentations, 16, located substantially at the lowest point of the recesses, 14. Pivotally secured to the side of the plate are two spring-pressed pawls, 17 and 18, which are adapted to engage with the indentations, 16, and thereby hold the disk against free rotation. The shoulders or operative parts of the pawls are arranged at a suitable distance apart shown in the drawings as equal to two and a fraction times the distance or space between two adjacent indentations, whereby when one of the pawls is in one of the indentations, the other pawl will be engaging with the wall of the recess 15 substantially midway between two of the indentations, as shown in Figs. 47 and 48 and each pawl is provided with a shoulder, which will prevent retrograde or backward movement of the disk, yet will permit the disk to be rotated in the opposite direction by the application of sufficient force. The opposite face of said total disk is provided with an annular series of shoulders, 19, preferably formed by cutting notches in a concentric wall, or ring, 20 formed thereon.

The column disk, 9, is preferably formed as an annular plate which is seated upon the ring, 20, and has its periphery recessed as at 21, which form teeth, 22, each of which is provided with a number, or character, for indicating the desired number or item of the column, and also for recording the same when the recording mechanism is actuated. The inner face of the disk, 9, is recessed or cut away as shown at 23, within which is seated a spring-pressed pawl, 24, in position for engaging with the shoulders, 19.

The pawl 24 is so located relative to the shoulders 19 that when the disk 10 is standing in its normal or unoperated position, as shown in Fig. 44, the free end of the pawl will stand to the rear of a shoulder a distance equal to one-third of a step, said step being the distance between the two shoulders so that when the disk 9 is rotated far enough to move its naught from its normal to its printing position, it will have to move one-half of that distance, or one-third of a full step before the pawl will engage with the first shoulder ahead of it on the total disk; and, therefore, the total disk will be moved only one-third of a step, while the column disk will be moved first two-thirds, but after which they will move together one or more full steps, depending upon the key that has been depressed in the key frame.

Reciprocally mounted within the frame, 2, are a series of key frames, 25, the forward end of each of which is provided with a series of keys, 26, and the rear end is formed into a rack, 27, which is adapted to extend through the lower portion of the division plate, 11, and engage with the teeth, 22, of the column disk, 9. The lower portion of the plate, 11, is preferably formed into or provided with a casing, 28, for the reception of the rack, 27, which prevents the possibility of the rack engaging with any other disk than the one which it is actuating, thereby preventing the possibility of its retarding the motion of any other of the disks. In order to prevent as much as possible the tilting or canting of the racks, 27, so as to interfere with the proper movement of the disks with which they engage, the bottom of the casing, 28, is preferably provided with a shoulder, 28' Figs. 3 and 49, substantially midway of its length upon which the bottom of the rack is supported and moves back and forth. Each side of the division plate 11 is recessed for the reception of the disks, 9 and 10, the recess 29 upon the side of the plate directly above the casing, 28, being deep enough for the reception of the column disk and the total disk of one plate extending into the recess upon the opposite side of the adjacent plate. In this manner the column disk is actuated by the key frame connected with that division plate, and the total disk is held in position by the pawls on the adjacent division plate, whereby each column disk actuates the total disk connected therewith, but neither pair of disks is connected with the disks of any other pairs, so that it is impossible to carry from one set of disks to the other, said carrying portion being performed by other mechanism, which will be hereinafter described.

The forward end of each key frame is preferably formed as a hollow casing, 30, Figs. 19 and 21 within which are reciprocally mounted the keys 26 and a longitudinally reciprocatory locking bar, 31. Each key preferably comprises a stem having the usual head, 32, at the upper end, which is provided with characters to indicate one of the digits from one to 9, and the lower end is provided with shoulders, 33, as by cutting away the sides of the stem, with which a spring, 34, is adapted to engage and normally hold the keys in an upward or undepressed position. The stems are preferably flat or angular in cross section, and project through alined openings, 35, in the top and bottom, respectively, of the casing, 30. Each key is provided upon one side with a shoulder, as a pin or projection, 36, which is adapted to be engaged by a shoulder, 37, on the locking bar, 31. The shoulder 37 is preferably formed upon one of the walls of a substantially V-shaped notch or recess, 38, formed in the upper edge of the bar. The bottom or apex of the notch 38 is at such a distance from the end of the shoulder 37 that when the shoulder 36 on any key is forced to the bottom of the notch, the bar 31 will be moved so far endwise that all of the shoulders will be moved so far back that all of the other keys will be released and will be returned to their normal positions by the springs, 34, but upon the upward or return movement of the excessively depressed key, the bar, 31, is moved toward its normal position by a spring, 39, which will cause the shoulder of said notch to engage with the projection on said key and lock it in its operative or partly depressed position. By constructing the key mechanism in this manner, it is evident that two or more of the keys in the same key frame may be simultaneously depressed and locked in their operative or semi-depressed condition, but it will be impossible to actuate the machine when in this condition, as will be hereinafter described, but in case that a wrong key has been depressed at any time, it can be released and the proper key "set" or put into its operative position by depressing the desired key to the limit of its depression and then releasing it in the same manner as though it had been depressed originally. But it will also be evident that after any one of the keys has been depressed or set in its operative position, it will be impossible to put that key frame in an inoperative condition by depressing any of the other keys, because the depression of one key to release another will always result in the locking of the last key depressed in its operative position, that is, with the lower end of its stem projecting below the casing far enough to be engaged by the actuating mechanism hereinafter to be described. Therefore, to clear any key frame, or to place it in its inoperative condition after any key has been depressed, means are provided for manually reciprocating the locking bar, 31, so as to release the projections on the key stems from their respective shoulders on the locking bar, which is preferably done by extending the forward end of the bar 31 beyond the end of the casing and forming it into or providing it with a head or button, 40. In this manner each key frame may be placed in an inoperative condition independently of the others, but when it is desired to place all of the keys in that condition simultaneously, a rocking bar, 41, Figs. 3 and 4 may be pivotally mounted in the frame, 1, in position for simultaneously engaging with tripping pawls, 42, there being one of said pawls pivotally mounted to the rear end of the locking bar of each frame and projecting up through a perforation in the casing 30 and adapted to engage with the forward wall of said opening as a fulcrum, whereby when the upper end of the pawl is moved forward by the rocking bar 41 the locking bar 31 is moved rearward to cause the shoulders 37 to release the shoulders 33 on the key stems. The bar 41 is actuated by means of a lever, 43, which extends forward adjacent to the side of the key board in position for convenient access by the operator, and each pawl is held in its normal or upright position by means of a spring, 44. See Figs. 1, 2 and 3.

The forward ends or casings of the key frames are reciprocally mounted between flanged guides, 45, which are rigidly secured between the forward ends of the side plates 2 and 3. The bottom of each guide way is provided with a recess or channel, 46, through which a projection, 47, upon the bottom of the key frame is adapted to pass when the key frame is reciprocated, and a passage way is formed at the upper end of each guide way for the passage of the key stems, by spacing the adjacent flanges 48 at the upper edges of the guides 45, a suitable distance apart. See Figs. 11 and 12.

The keys in each key frame are located at a distance apart equal to the space between two of the adjacent teeth 49 of the rack 27 and each projection 47 is located at a corresponding distance in front of the forward key, said forward key being numbered one and the projection being adapted to cause the key frame to be moved far enough longitudinally to rotate the column disk so as to cause the naught or zero mark to appear for registration or to make a record when the recording mechanism is operated.

The key frames are actuated or reciprocated by means of a draw bar, 50, which projects through slots 51 in the side pieces 2 and 3, and has its ends connected with rocker arms 52 by means of links, 53. As shown in Figs. 1, 2 and 4. The arms 52 are secured to a shaft 54 which is oscillatorily mounted in the lower portion of said side pieces, preferably by extending one of the arms above the top of the machine and providing it with a handle, 55. When the actuator or draw bar 50 is moved forward by the movement of the handle 55, as shown in dotted lines in Fig. 3, it will pass directly underneath all of the casings 30 a distance equal to or greater than the length of the projection 47, whereby none of the bars will be moved or actuated unless one or more of the keys 26 are depressed. The draw bar 50 is preferably provided with a plurality of gravity pawls 56, one for each key frame which is adapted to engage with the projecting portion of any key that is depressed when the bar is moved forward by the handle, 55. In its normal position the bar 50 stands to the rear of the rearmost key, which key is numbered 9 and is adapted to cause the key frame to be moved its greatest distance and thereby give the column disk its greatest rotation when said key is depressed and the draw bar is actuated by the handle. By constructing and arranging the parts in this manner it is evident that when any key in any key frame is depressed, said key frame will be moved longitudinally a distance far enough to cause its column disk to be given a rotation sufficient to bring the character on the disk corresponding with the number on the depressed key into position for registering that number and to record the same when the recording mechanism is actuated.

If more than one key frame has a key depressed, each frame will be moved longitudinally the desired distance as soon as the draw bar engages with the depressed key, whereby any number can be registered and recorded, comprising as many numbers as there are key frames in the machine. When none of the keys are depressed, or when the machine is standing at its cleared or zero position, it is desirable that if the recording mechanism should be actuated that no record be made, to accomplish which, the characters on the two disks are arranged in such position that they are out of their recording position, as heretofore described, but when one or more of the keys are depressed, the characters on both disks of each pair are moved into such a position that the record can be made from either or both as may be desired. This is accomplished by causing the actuator or draw bar 50, when moved to the limit of its forward movement, to have engaged with the stem of each depressed key and thereby have moved its frame forward. This movement of the key frames will move the column disk connected therewith far enough to cause the proper character thereon to move into alinement with the printing point, 12″, by the time the recording mechanism is made to engage therewith, and also to rotate the total disk a part of a revolution by the engagement of the pawl 24 with one of the shoulders 19. This movement of the disks will cause one of the pawls, as 18 in Fig. 46, to be disengaged from one of the recesses 16 in the disk 10, and the other one, as 17 in Fig. 47, to be engaged with the succeeding recess, 16, but when the key frames are returned to their normal positions by the return of the draw bar, 50, each column disk will be returned by its rack, 27, to its normal position, but each total disk that has been actuated will remain with the proper character at the recording line, 12‴.

As the machine is preferably made without any "naught" key, it is impossible to actuate any column disk to print naught or a cipher by depressing any key upon the frame controlling that set of disks. Hence, it is necessary to cause the key frame to always move far enough to rotate the column disk two-thirds of a step farther than the distance necessary to bring the desired number to the printing point. For instance, if it should be desired to print "1" when the machine is normal, or standing at zero, the "1" key is depressed in the first key frame, and the key frame then operated, which will cause the disks 9 and 10 to move from the position shown at the left in Fig. 54 to the next position to the right, as indicated by #1 which will carry the number 1 on each disk into its printing position, with the column disk 9 one-third of a step in advance of the total disk, 10. In other words, the column disk will have been moved one and two-thirds of a step forward, while the total disk will only have been moved one and one-third of a step. On the return of the key frame to its normal position, the column disk will be returned to its normal or zero position as shown at #2 in said figure, but the total disk will be held in its new or set position by the engagement of the pawl 17 with the recessed portion of the disk, 10, as shown in Fig. 47. Now, if it be desired to add 5 to the "1", the "5" key is depressed and the key frame is again operated, which will carry the column disk forward five and two-thirds steps, which will bring the number 5 into its printing position, as shown at #3 in Fig. 54, while the total disk will only be carried forward five steps, which will cause "6" on its periphery to stand on its printing line. When the key frame is again returned to its normal position, the column disk will be returned to its zero position, as shown at #4 in said figure, but the total disk will again be held stationary by the pawl 17 with the number six in its exposed or printing position.

A stop plate 57 is pivotally secured to the forward end piece of the main frame in position to have its upper edge swung up in front of all of the channels 46 whenever the stem of a depressed key is forced against it by the draw bar 50. In this position the plate will engage with the projections 47 on the normal key frames and stop their further forward movement when they are actuated by the bar 50, and thereby prevent the momentum of any frame from carrying it so far as to rotate its disk 9 out of register, or beyond its printing position. The stops 47 are placed at such a distance from the ends of the key frames that each frame can be moved far enough to rotate the naught or zero of the disk 9 from the normal or blank position 12' to the printing position 12" before the stop 47 will engage with the plate 57. As the plate 57 is never raised until it is engaged by a depressed key stem, and as this engagement only takes place just as the bar 50 reaches the limit of its forward movement, it will be seen that the projection 47 of any frame on which a key has been depressed, will have passed over the top of the plate before the plate has been raised by the key stems.

As none of the key frames is provided with a cipher or naught key, it is impossible to print a zero or cipher in any column without printing another character to the left of it. And to cause each of the key frames to the right of any frame in which a key is depressed to actuate the registering disk, the gravity pawls 56 on the bar 50 are so arranged as by being provided with projections, 56', that whenever any pawl engages with a depressed key stem, all of the pawls to the right of the pawl so actuated, will be automatically and synchronously raised or elevated into position for engaging with their respective projections, 47, and thereby causing the reciprocation of all of the key frames to the right of the one containing the depressed key to be moved forward a sufficient distance to cause the column disks to move their cipher or naught character into registering or recording position. In this manner the machine is adapted to register and record any number from one up to its full capacity, the digits above naught being secured by the depression of the keys of the key board, and the naughts being secured or registered by the gravity pawl engaging with the projections, 47. If more than one number upon any key bar should be depressed and locked in that position, it will be impossible to actuate the lever, 55, to the limit of its forward movement. The reason for this is because the stem of the first or foremost depressed key engages with the plate 57 and thereby prevents the further movement of the key frame, while the engagement of the draw bar 50 with the stem of the rearmost depressed key, prevents the further forward movement of the draw bar. To prevent the rearward movement of the draw bar from its partial movement, a pawl 58 is pivotally mounted on the handle, 52, in position for engaging with a segmental rack, 59. upon one side of the machine and locking the handle against return movement until after the handle has been moved to the limit of its forward movement. The pawl 58 is preferably constructed so as to engage with the rack and lock the handle against reverse movement in either direction until the handle has reached the limit of its movement in both directions, thereby preventing the possibility of actuating the handle in the wrong direction. In the drawings we have shown a spring, 60, which is adapted to engage with the pawl 58 and normally hold it in position for either one of its operative faces to engage with the rack, depending upon which end of the rack the pawl is located when the handle is started in its opposite movement. As soon as the machine becomes locked by reason of two depressed keys in the same key frame, as above described, the desired key upon said key frame is pressed down as far as it will go, which will cause its pin or projection 36 to go to the bottom of the recess 38 and thereby move the bar 31 longitudinally and release all of the other keys as heretofore described. As soon as the frame has been cleared in this manner, the forward movement of the handle and of the key frame can be continued until the desired number has been registered and recorded.

After the key frames have been moved forward by the draw bar in the above described manner, they are returned to their normal positions by the return movement of the handle which causes the draw bar to engage with shoulders 61 upon the underside of the frames, said shoulders being preferably formed by bending the portion of each frame downwardly where the rear end of the casing 30 and the forward end of the rack 27 are connected or united. When the key frames are returned to their normal positions in this manner each of the tripping pawls 42 is carried under and caused to engage with one of the cross pieces 4 between the side pieces 2 and 3. As the pawls 42 pass under the cross piece in this manner, each of them will be rocked upon the forward edge of the opening in the casing as a fulcrum, which will cause the inner or pivotal end of the pawl to move its locking bar 31 rearward far enough to release the keys that have been depressed and thereby place the machine in position for subsequent actuation. The openings in the casing through which the pawls 42 project are made long enough so that when the bars are moved forward, the pawls will be swung upon their pivots without actuating or moving the locking bars to which they are pivoted, thereby preventing the release of the keys until after their stems have been caused to be engaged by the draw bar when the handle 55 is moved forward. Owing to the difference between the width of the casings 30 and the registering mechanism, it is necessary to place the racks of the different key frames, except the central ones, in a different plane from their respective casings, which is accomplished by bending the shoulders 61 laterally to a greater or less extent, as will be understood.

As above described, after any one or more of the keys have been depressed and the handle moved, the column disks will have been rotated, each a distance corresponding with its depressed key and the total disks will have been correspondingly rotated, after which the return movement of the handle will return the column disks to their normal positions without changing the positions of the total disks. Subsequent depression of the keys and actuation of the handle will cause the alternate rotation of the column disks and the continuous forward rotation of the total disk to indicate the numbers or digits of the sum total from naught to 9. Therefore, to indicate a sum total greater than 9, it is necessary to provide means whereby the total disks of the pairs advancing to the left may be rotated a sufficient distance, in addition to the rotation given to them by their respective column disks, one step, so as to add or carry one from the preceding column or denomination, as, for instance, if the total disk of the first or unit column is standing at 9, and another number is to be added thereto, the total disk of the adjacent key frame to the left must be moved forward one step to cause the proper character on its periphery to be moved into position for indicating and recording the correct amount. This is preferably accomplished by reciprocally mounting upon each division plate, preferably by means of links, 62, a bar, 63, on which is mounted a shoulder in position for engaging with the radial shoulder of the total disk and moving it one step forward whenever the bar 63 is reciprocated. In Figs. 44 to 48 of the drawings the shoulder is shown as comprising a pivoted pawl, 64, which has its free end shouldered for engaging with a stop, 65, and its pivoted end provided with a spring, 66. The pawl 64 normally stands in its depressed or inoperative position with a shoulder 67 on its free end engaging with the stop, 65. A shoulder 68 on the lower edge of the pawl is adapted to engage with the stop, 65, and limit the upward movement of the pawl when it is moved upward into its operative position.

The pawl, 64, is adapted to be moved up into its operative or carrying position by one of a series of radially extending arms, 69, which are spirally mounted upon a shaft, 70, journaled in the plates 5 and 6. After engaging with the spring, 66, and moving the end of the pawl 64 into position for engaging with the total disk as above described, the end of the arm 69 is adapted to engage with a lever 71, which is pivotally secured intermediate its ends to one side of the bar 63 and thereby carry the bar and the pawl 64 forward far enough to properly rotate the total disk. After the arm 69 has passed out of engagement with the lever 71 and spring 66, the bar and its attached parts are returned to their normal positions by a spring 72 which preferably encircles a rod or stem 73 that is provided with a shoulder 74 and is pivotally secured at that end to one of the links 62 and has its free end projecting through a perforated stop or bracket, 75, the ends of the spring engaging with said shoulder and bracket.

In its normal position, or when it is not desired to actuate the total disk, the lower end of the lever 71 is held up out of the path of the arm, 69, by means of a lever, 76, which has one end adapted to engage with the upper end of the lever 71, as by a shoulder, 77, and its opposite end provided with a shoulder as a pin 78 which projects beyond the opposite side of the plate 11 in position for being engaged by a pawl, 79. The inner edge of the pawl 79 is provided with a tooth or projection, 80, which is adapted to engage with the periphery of the shaft, 8, and hold the free end of the pawl in position for engaging with the shoulder 78 at all times except when seated within a recess, 81, formed in the periphery of said shaft, said recess preferably extending from one end of the shaft to the other, whereby the pawl 79 of each of the disks, when said disks are in their normal positions, will be in said recess at the same time.

The arms 69 are arranged spirally around the shaft 70 as shown in Fig. 41 so as to engage successively with the levers 71 upon the bars 63, as shown in Fig. 48, commencing with the first or right hand division plate.

The arms are given a complete revolution with every reciprocation of the handle 55 as by means of a toothed segment 82, which engages with a pinion 83, loosely mounted on the shaft 70. A pawl 84 is connected with the pinion, as by means of a flange, 85, in position for engaging with a shoulder 86, on one end of the shaft, whereby when the handle is drawn forward, the pawl is moved around the shaft and the shoulder for actuating it, but upon the return movement of the handle, the pawl engages with the shoulder and causes the shaft 70 and the arms 69 to be rotated. In this manner the arms are caused to engage with any or all of the levers 71 which may have been thrown into their operative position by the action of the pawl 79 on the shoulder 78 and cause the total disk to be moved forward one step for the purpose of carrying one as above described. The segment 82 is of a greater length then the circumference of the pinion 83, whereby when the handle 55 is moved forward to actuate the column disks, the pawl 84 will be carried so far beyond the shoulder 86 that time will be given for the record of the column disk to be made without blurring before said pawl will engage with the shoulder on the return movement of the handle when the shaft and arms 69 are actuated for setting the total disks into their proper position for having a record made therefrom when it is desired to secure the sum total of the added columns.

When two or more total disks have substantially reached the limit of a complete revolution and the nines are in position for printing, as 99, or 999, etc., and one or more numbers are added by the column disks, it is necessary that the carrying mechanism for said disks be thrown into operative position while the radial arms are each moving one step, that is, passing into and out of engagement with the levers, 71. The slight movement of the levers 76 in being disconnected from the other end of said lever 71 permits such movement of the carrying mechanism whereby the possibility is avoided of the arms being rotated so rapidly as to reach their point of engagement with said mechanism too soon.

In the arrangement of the disks relatively to the plates 11, as shown in Fig. 40 it will be noticed that there are two disks, or a set, between each two of the plates and two between the first plate and the side piece or plate, 5, while there is only one disk between the last plate, 11, and the side piece, or plate, 6, and there is a radial arm for each of the spaces except between the first plate and the side piece 5. The reason for this is that the total disk of the first set is never carried; and by adding an additional accumulator disk on the left hand side, or between the last plate 11 and the side piece, 6, the lever 71 on the bar 63 can be tripped by the pawl 79 of the last set of disks so that the last arm 69 will actuate said single disk and thereby enable the machine to indicate more than the "9" on the accumulator disk of the last set. In other words, there is one more accumulator disk than there are key frames which will enable the machine to register two places or denominations for the last key operated column. The column disks are also secured against movement while the record is being made, by providing the links 53 with an elongated opening as shown at 87, in Fig. 5 where they are connected with the draw bar 50 which permits of the reciprocation of the handle 55 for a short distance at the forward limit of its stroke without moving the draw bar in either direction.

The arms 69 are held against retrograde movement by a pawl 88 which engages with a shouldered collar 89 on the shaft 71 and it is prevented from making more than a complete revolution when the handle is reciprocated by means of a stop, 90, which is secured to the segment 82 in position for engaging with one of said arms at the limit of the return movement of the handle 55. The handle 55 is also locked against accidental movement forward by a detent 91, which is adapted to engage with a catch 92 on the side of the frame, 1, and hold the handle in that position until after the detent has been released. The detent is adapted to be automatically released from the catch by pivotally securing the upper end of the handle to the lower portion above the detent and providing the pivotal portion with a shoulder 93, which is adapted to engage with the rear end of the pawl and release its forward end from the catch when the upper end of the handle is grasped and moved forward for actuating the adding mechanism.

After the disks have been actuated in the above described manner, and it is desired to make a record therefrom, a ribbon, 94, is arranged over the portion of the disks projecting beyond the cut away portion of the plates 11 and a paper strip, 95, is forced against the ribbon preferably by means of a yielding platen, 96. The paper and mechanism for controlling its movement are mounted in a frame, 97, which is pivotally supported within the main frame, 1, by hangers, 98, as shown in Figs. 3, 5 and 6. The hangers are preferably formed of a V-shape, with one of the legs of one of them bent laterally out of the plane of the other to act as a spring for normally holding the printing frame 97 nearer one side of the frame, 1, than the other as shown in Fig. 2.

The roll from which the paper, 95, is unwound, is mounted upon a removable rod, 99, in the rear end of the frame, 97, and from there it passes under and up over in front of a feed roller, 100, underneath a pressure roller 101, and up under a knife or serrated paper cutter, 102, said cutter being preferably hinged at one end and adapted to be locked in position by a turn button, 103, at the other.

The shaft of the feed roller is extended at one end beyond the side piece 2 and is provided with a knurled button 104, and a shouldered collar 105. A pawl, 106, in Fig. 1 is mounted upon the forward end of a link, 107, which is secured at its rear end by means of the paper roller rod 99. A stop, 108, is located in such position that when the printing frame is being returned to its normal position after having made an impression, one of the shoulders on the collar, 105, will engage therewith and thereby cause a sufficient movement of the paper as to properly space the impression between the different numbers the desired distance apart.

The portion of the feed roller which is adapted to be adjacent to the registering mechanism when moving forward, is cut away annularly so as to leave thin webs or fins, 109, for engaging with the paper and feeding it forward. The surface of the feed roller, including the peripheries of the fins, is roughened, as by longitudinal corrugations, which will assist in feeding the paper when the roller is rotated.

The platen, 96, is preferably formed from a plurality of press feet, 110, each of which is recessed upon its upper surface as shown at 111, in Fig. 8, and said recessed portions fit between the webs, 109, of the feed roller, as shown in Figs. 9 and 10. The forward end of each foot is preferably recessed, as at 112, for the reception of a piece of suitable material, preferably felt, which is adapted to engage with the ribbon over the characters on the disks, 9 and 10, with a yielding pressure and thereby secure a clearer imprint than could be secured by using a hard platen. The forward ends of the feet are further provided with a rearwardly extending horn or projection, 113, which engages with the recessed portion of the feed roller similar to a yoke, and its rear end is supported upon the forward end of a shouldered stem, 114, which projects through a bar, 115. Each stem is provided with a spring, 116, which engages with the shoulder thereon, and normally forces the foot 110 forward with a shoulder, 117, on the rear end of the yoke or foot in engagement with a ledge, 118, depending from the forward edge of the bar 115. The forward end of the stem 114 is screw-threaded where it engages with the rear end of the foot 110, and the rear end of the stem is formed angular so that it may be rotated and thereby cause the screw threaded end to be turned a greater or less distance into the foot for the purpose of securing the desired amount of pressure of the paper against the ribbon to secure a clear impression.

The end of the shaft of the feed roller is mounted as shown in Fig. 7 in elongated openings, 119, in the sides of the frame, 97, and two springs, 120, engage with the shaft and normally press the roller so far forward as to decrease the pressure of the paper against the presser feet to prevent its being torn when being fed forward.

The pressure roller, 101, is preferably formed from glass to permit of the impression upon the paper being seen at all times and its ends are preferably journaled in elongated openings, 121, whereby it may be moved toward and from the feed roller, 100. A lever, 122, is pivotally secured to each side of the frame 97 in position for engaging with one of the ends of the pressure roller and holding the roller in yielding engagement with the feed roller by means of a spring, 123, which is secured to the free end of each of said levers. As the frame, 97, is carried forward, the shafts of the feed roller engage with two arms, 124, each pivotally located on one side of the machine as at 125, and having its rear end adapted to be adjusted by engaging with a set screw, 126. In this manner the movement of the feed roller relatively to the printing face can be controlled with any degree of accuracy required.

The printing frame 97 is swung upon its pivot as shown in dotted lines in Fig. 5 for making the impression as above described by means of a reciprocatory push bar, 127, which is provided with two shoulders, 128 and 129. The rear end of said bar is pivotally secured to the lower portion of the frame 97 and its forward end is suspended by a link, 130. The shoulder 128 is located adjacent to the shaft 54 and the shoulder 129 at the forward end of the bar. The shaft 54 is provided with a projection, 131, which is adapted to engage with the shoulder 128 and force the bar 127 to the rear as the handle 55 is drawn forward, thereby causing the platen 96 to force the paper against the ribbon and make an impression as above described. When the handle 55 is returned to its normal position and the projection 131 is withdrawn from its pressure against the shoulder 128, a spring 132 connected with the rear portion of the printing frame 97 causes the frame to swing back into its normal position ready for a subsequent action.

As above described, the forward movement of the handle will cause the rotation of the column disks to indicate the desired numbers, and also cause an impression thereof to be taken upon the paper at the desired distance below the preceding impression from the column disks. At the same time that the column disks are being actuated, they also actuate the total disks, and upon the return movement of the handle the radial arms 69 cause the total disks to be rotated to indicate the total of all of the numbers that have been indicated by the depression of the key board in the previous manipulations of the machine. If at this time it be desired to take an impression from the total disks and record the same below the columns, a handle or lever 133 pivotally mounted at the front of the machine is drawn forward which will cause a projection 134 thereon to engage with the shoulder 129 and force the push bar 127 to the rear, thereby swinging the printing frame 97 forward toward the disks as above described.

As heretofore described, the characters upon the total disks occupy a position above or in front of the characters upon the column disks, and it is necessary that the platen and the paper be carried forward so as to cause them to engage with the characters on the total disk when the impression is made, instead of against the characters on the column disks, as above described. It is also necessary that the paper be moved to the right a distance equal to the space between the planes of the column disks and the total disks to cause the figures of the total disks to stand in alinement with the proper figures of the columns. To accomplish this compound movement, a rod or connector, 135, is connected with one of the legs of the hangers, 98, upon each side of the frame 97 and with a disk, 136, at each end of a rock shaft, 137, to which the shaft handle 133 is secured. As the rod, 135, is thus moved forward with the forward movement of the handle 133, the two hangers are swung upon their pivot points, 138, and the printing frame which is pivotally supported at the end of the other leg of the hangers, is swung upward and forward far enough to cause the printing surface to engage with the total disks instead of the column disks. At the same time that the frame 97 is being thus moved upward and forward, a pin or projection, 139, upon the left side of the frame, as shown in Fig. 38 is caused to engage with an incline 140, which forces the entire frame to the right far enough to cause the impressions from the total disk to appear under their proper columns. Upon the return movement of the handle, 133, the parts assume their normal positions, the frame 97 being forced to the left by the resiliency of the leg of the hanger which has been bent out of the plane of the hanger as heretofore described.

To permit of the handle 133 being bent down at its upper end so as not to project above the machine and be in the way of the operator, it is preferably jointed as shown at 141, in Figs. 1, 5 and 6 and provided with two shoulders, 142 and 143, one of which, as 142, is adapted to engage with a shoulder, 144, on the lower portion of the handle, and the other one as 143 is adapted to be engaged by a pawl or detent, 145. The engagement of the shoulders 142 and 144 render the handle substantially rigid when being drawn forward, and the engagement of the shoulder 143 with the pawl, renders it substantially rigid for the return movement. By the time the handle reaches the limit of its return movement, a projection or pin, 146, enters an inclined slot 147 in the side, 2, of the frame, and causes it to be drawn downwardly out of engagement with the shoulder 143 and thereby release the upper end of the handle so that it can be folded down substantially even with the top of the key board. The shoulder, 143, is formed by cutting away a part of the pivotal end of the upper end of the handle which is formed upon a circle with its pivot point as the center, whereby when the upper end of the handle is moved forward adjacent to the key board, as above described, the remaining or un-cut portion of said circle will engage with the upper end of the pawl 145 and prevent its upward movement, thereby locking the projection 146 in position so that it will engage with the lower wall of the slot 147 and prevent the accidental movement forward of the lower portion of the handle 133 until after its upper portion has been moved upward to bring the shoulder 143 into register with the end of the pawl 145. By constructing the parts in this manner, it is impossible for the handle 133 and the part connected therewith to be moved out of their proper position, or until the operator is ready to actuate said parts to take an impression from the total disks. The forward movement of the handle 133 is limited only by the pressure of the platen against the characters on the registering disk, but the forward movement of the handle 55 is preferably limited by an adjustable stop, 148, on the side of the frame, 1.

The upward and forward movements of the frame 97 as above described, may be varied or adjusted to cause the platen 96 to properly register with the characters on the total disks, by adjusting the connections of the rod 135 at its forward end with the disk 136. This is accomplished by providing the disk 136 with a radial slot 149 through which a pin 150 on the rod 135 projects and also providing a second disk 151 having a spiral slot 152 formed therein through which said pin also projects. By causing the slots 152 and 149 to register and rotating the disks relatively to each other, it is evident that the pin 150 will be moved radially in the slot 149 and thereby vary the length of the throw of the arm 135, as the handle 133 is moved back and forth. The disks 136 and 151 are locked in their adjusted position by means of a screw 153 which projects through a segmental slot 154 in the disk 135 and engages with the disk 151. The handle 133, is preferably held against lateral movement away from the side of the frame 2 when in its forward position by means of a segmental guide 155.

If at any time it is desired to take an impression of the total disks without feeding the paper forward, as by taking it upon a separate strip of paper, the stop 108 is moved out of its position for engaging with the shouldered collar 105 as by drawing a rod 156 forward and securing the same. The rear end of the rod as shown in Figs. 1 and 32 is pivotally connected with an extension 157 from an arm 158 on which the stop 108 is located, and having its free end provided with a shouldered hook, 159, which is pushed down through an opening in a top plate 160, which is secured to the side pieces 2 and 3 directly to the rear of the key board. When the parts are arranged in this manner the handle 133 can be moved forward and an impression made from the total disks and the printing frame returned to its normal position without causing the stop 108 to engage with the shouldered collar and thereby preventing the rotation of the feed roller. A reciprocatory tripping bar 161 is pivotally connected at its rear end with the frame 97 and has its free end passed under a clamp 162 and bent upwardly so as to slide over a pin 163 which projects laterally from the side of the rod 157 at the hook or shoulder, 159. The edge of the tripping bar 161 adjacent to the shoulder 159 is slotted or notched as shown at 164, which will permit of the pin passing to the upper part of the bar so that on its return movement the incline of the upturned end of the bar will engage with the pin 163 and thereby disconnect its shoulder, 159, from the edge of the opening and permit of the bar being returned to its normal position by the action of a spring 165, which will also swing up the arm 158 so that the stop 108 is again placed in position for engaging with the shoulders on the collar 105, so as to feed the paper forward when the machine is again manipulated.

The ribbon 94 is preferably fed diagonally across the face of the indicating disk or type wheels by journaling two spools, 166, at a slight angle to the axis of said disks. The spools are journaled in two brackets, 167, one of which is located nearer the top of the machine than the other and each of them is provided with a roller 168 over which the ribbon passes as it is drawn across the face of the type wheels.

A ratchet wheel 169 in Fig. 24 is secured to the shaft of each of the spools, 166, and a feed pawl 170 is adapted to engage with each ratchet and rotate it step by step as the frame, 97, is swung on its pivots. A stop pawl, 171, is also adapted to engage with each of the ratchet wheels and prevent its retrograde movement. Each of the pawls 170 is pivotally mounted upon a plate 172, which is connected with the frame 97 at its upper end so as to be reciprocated when the frame is swung upon its pivots, and its lower end is mounted in suitable guides, 173. The connection between the plate 172 and the frame 97 at the left hand side of the machine is preferably made by a link 174, and the connection at the right hand side of the machine is preferably made by a slotted extension 175, which permits of the proper movement of the parts without objectionable features which might otherwise have been required.

As both pawls for each ratchet wheel is spring-actuated and would engage simultaneously with their respective ratchets and wind the ribbon in both directions at the same time, it is necessary to provide means which will hold the pawls of one wheel out of engagement when standing in one position and will hold the other pawls out of engagement when standing in another position. This is accomplished by means of a longitudinal shifting bar, 176, which is seated under guides 177 on the forward edge of the top plate 160, said edge being preferably bent downwardly at an angle. Each end of the bar 177 is adapted to engage with the feed pawls 170 and hold them out of engagement when the bar is moved endwise, and its forward edge is provided with two shoulders 178, which are adapted to engage with the stop pawls 177 and hold them out of engagement at the proper time. The bar is shifted from one position to the other by means of a lever 179 which is pivotally secured at one end to the bar and has its sides or edges provided with inclined faces, 180, and shoulders 181 which are adapted to engage with either one of two pins or projections 182 when the lever is moved in one direction or the other. The free end of the lever is preferably provided with an arrow 183, to indicate in which direction the ribbon is being fed when the lever is thrown to cause one set of the pawls or the other to engage with their respective ratchet wheels on the ribbon spools. When it is desired to rotate one of the spools, as when reversing the ribbon other than by the step by step motion, as above described, or when putting on a new ribbon, the spool may be wound by means of a handle or key, 184, which is preferably connected therewith by means of a knuckle or universal joint, 185, and its free end may be suspended in a suitable support, as a loop or saddle, 186.

After the machine has been manipulated as above described, and it is desired to "clear" the same, or restore the type wheels or indicating disks to their normal or non-printing position, the shaft 8 is rotated by means of a crank 187, which is preferably connected therewith by means of two pinions, 188 and 189 as shown in Figs. 1 and 3. The pinion 188 is secured to the end of the shaft 8 on the outside of the plate 5, and the pinion 189 is mounted upon the inner end of a shaft, 190, which is journaled at its inner end in said plate 5, and at its outer end in the side piece 2, and provided with a handle or crank, 187. By rotating the shaft 8 it will be seen that as the slot or recess 81 therein comes into position, the teeth, 80, on each of the pawls 79 will drop thereinto and cause the disk on which the pawl is secured, to be carried around until the shaft reaches the limit of its rotation, as when the crank 187 engages with a shoulder 191. In this position the pawl 17 is seated in one of the indentations 16 and holds the total disk positively against retrograde movement, but yieldingly against forward movement. The stop 191 is movable so as to permit of the forward movement of the handle when it is again desired to rotate it for clearing the machine, and a yielding stop 192 is preferably located to the rear of the crank so as to prevent its being turned backward. The face of the stop 192 as shown in Fig. 35 is inclined to permit of the crank forcing the stop in out of the way just as it is coming into engagement with the stop or shoulder, 191.

Having described our invention, we claim:

1. In an adding machine, a plurality of sets of registering disks, means for moving the characters thereon into two positions, one of said positions being the zero or nonprinting position and the other being the operative position, the operative position of one disk being different from the operative position of the other disk.

2. In an adding machine, a plurality of disks, each provided with characters, the characters of the alternate disks occupying one position after having been actuated, and the characters of the other disks occupying a different position, and means for taking an impression from the characters of either set of disks as though they occupied the same position.

3. In an adding machine, printing mechanism, a plurality of sets of disks, means for actuating them, the characters of the disks of one set occupying one position relatively to said mechanism after said disks have been operated and the characters of the other disks occupying another position after they have been operated, and means for moving said mechanism vertically and laterally relatively to said disks.

4. In an adding machine, printing mechanism, a plurality of independently operable sets of indicating disks, means for holding one of the disks of each set against reverse movement in either of two positions relative to the printing mechanism, and means for reciprocally rotating the other disk of each set so as to move the first-mentioned disk into one of said positions.

5. In an adding machine, a plurality of sets of independently operable registering disks, one of the disks of each set being provided with a series of shoulders upon each side, two stops for engaging with the shoulders upon one side, and means upon the other disk of said set for engaging with the shoulders upon the other side of the first-mentioned disk.

6. In an adding machine, independently operable sets of registering disks, one of the disks of each set being recessed upon one side and provided with shoulders and with a circular series of shoulders upon the other side, two stops for engaging with the shoulders upon the recessed side of said disks, a pawl connected with the other disk of said set for engaging with said series of shoulders when moving in one direction and means for actuating said other disk.

7. In an adding machine, independently operable sets of registering disks, one of which is recessed upon one side and provided with indentations in the wall of said recess, and the opposite side is provided with a recessed flange, the other disk being annular to fit upon said flange and recessed upon one face, and a spring-pressed pawl mounted in the recess of said face in position for engaging with the shoulders formed by recesses in said flange when moving in one direction.

8. In an adding machine, independently operable sets of registering disks, one of which is provided with shoulders upon each side and has its periphery recessed to form radial and inclined recesses, the other disk being annular and having its periphery recessed to form operating teeth, means on said annular disk for engaging with the shoulders upon one side of the first-mentioned disk, and rack mechanism for engaging with said teeth.

9. In an adding machine, a series of division plates, one side of each of which is provided with two pawls, a pair of registering disks between the adjacent plates, one of which is recessed and provided with indentations adapted to be engaged by said pawls, and the other disk is provided with means for engaging with the first-mentioned disk and moving it in one direction, and means for moving the second-mentioned disk in two directions.

10. In an adding machine, a plurality of division plates, the lower portion of each of which is adapted to receive a reciprocatory rack, a pair of registering disks mounted between the adjacent plates, one of which disks is provided with means for being engaged by a rack, and is adapted to move the other disk in one direction only, and a reciprocatory rack mounted in each plate in position for engaging with said disk of each set.

11. In an adding machine, a series of division plates, the lower portion of each of which is provided with a casing, a shoulder in said casing, a pair of registering disks between the adjacent plates, one of which is provided with teeth and is adapted to move the other disk in one direction only, and a reciprocatory rack mounted in said casing with its lower edge resting upon said shoulder and its upper edge provided with teeth for engaging with said toothed disk.

12. In an adding machine, a plurality of registering disks, independently operable, key frames for actuating the same, the forward end of each frame comprising a casing, depressible keys mounted thereon, means for locking said keys in a depressed position, and means for reciprocating any of said frames independently of the others when a key thereon has been actuated.

13. In an adding machine, a plurality of registering disks, independent reciprocatory key frames for actuating the same, the forward end of each frame comprising a casing, depressible keys and a locking bar in each of said casings, and means for reciprocating any of said key frames independently of the others on which a key has been actuated.

14. In an adding machine, a plurality of registering disks, independent reciprocatory key frames for actuating the same, the forward end of each frame being provided with keys, a reciprocatory bar for locking said keys in a depressed condition, springs for returning said bar and said keys to their normal positions, and means for reciprocating any key frame independently of the others on which a key has been actuated.

15. In an adding machine, a plurality of registering disks, reciprocatory key frames for actuating the same, the forward end of each key frame being formed into a casing, a reciprocatory bar mounted in said casing, the upper edge of which is provided with an inclined walled recess, said wall being provided with a shoulder, keys through said casing, the stem of each of which is provided with a shoulder to enter said recess and be engaged by the shoulder on said wall, means for reciprocating any of said frames when a key thereon has been actuated, and means for reciprocating said bar to release said key when the key frame is being reciprocated.

16. In an adding machine, a plurality of registering disks, reciprocatory key frames for actuating the same, the forward end of each frame being formed into a casing, a reciprocatory bar in said case, the upper edge of which is provided with inclined walled recesses, the inclined wall of each recess being provided with a shoulder and the bottom of the recess extending beyond the end of said shoulder, reciprocatory keys mounted in said casing, the stem of each of which is provided with a projection which is adapted to enter one of said recesses and to be engaged by said shoulder, means for reciprocating any of said key frames on which a key has been depressed, and means for moving said bar to release said key.

17. In an adding machine, a plurality of registering disks, independent reciprocatory frames for actuating the same, the forward end of each frame being provided with keys, a reciprocatory bar for locking said keys in a depressed position, said bar being provided with means for manually operating it, and means upon each key for actuating said bar to release a depressed key.

18. In an adding machine, a plurality of registering disks, independent reciprocatory frames for actuating the same, the forward end of each frame being provided with reciprocatory keys, the stem of each of which is shouldered, and a reciprocatory bar for each frame, the forward end of which is provided with a button for moving the same longitudinally, and the intermediate portion with means for engaging with said shoulders.

19. In an adding machine, a plurality of registering disks, reciprocatory frames for actuating the same, the forward end of each frame being shouldered and provided with keys and a reciprocatory bar for locking the keys in a depressed position, a tripping pawl pivotally mounted on said bar in position for engaging with said shoulder when moved in one direction only, means for engaging with said pawls and actuating said bars to release the depressed keys and means for moving the pawls in two directions when the frames are reciprocated.

20. In an adding machine, a plurality of registering disks, reciprocatory key frames for actuating the same, the forward end of each frame being provided with a perforated casing, a reciprocatory bar in said casing, a pawl pivotally secured to the bar in position for projecting through said perforation, keys in said casing adapted to be locked in a depressed position by said bar, and a stop provided with means for moving it into a position for simultaneously engaging with all of said pawls and actuating the same to release all depressed keys.

21. In an adding machine, a plurality of registering disks, key frames for actuating the same, the forward end of each of which is provided with keys and a reciprocatory bar for locking the keys in a depressed position, a tripping pawl for each bar, and a stationary stop for engaging with all of said pawls and moving their respective bars for releasing all of the depressed keys when said key frames are reciprocated.

22. In an adding machine, a plurality of registering disks, reciprocatory key frames for actuating the same, the forward end of each frame being provided with depressible keys, and an actuator reciprocally mounted in position for engaging with any depressed key and thereby actuating the key frame upon which said key is mounted.

23. In an adding machine, a plurality of registering disks, reciprocatory key frames for actuating the same, depressible keys upon the forward ends of said bars, and a draw bar reciprocally mounted below said frame in position for engaging with any depressed key and thereby reciprocating the frame upon which said key is mounted.

24. In an adding machine, a slotted frame, a plurality of registering disks mounted therein, reciprocatory key frames for actuating said disks, depressible keys at the forward ends of said frame, a draw bar under said frames in position for engaging with a depressed key and thereby actuating the frame upon which said key is mounted, the ends of said draw bar projecting through said slots, a rock shaft mounted in the frame and provided with arms, the free ends of which are connected with the ends of said draw bar, and a handle for actuating said shaft.

25. In an adding machine, a plurality of registering disks, shouldered key frames for actuating the same, the forward end of each frame being provided with depressible keys and a reciprocatory draw bar normally located between said keys and said shoulder, and means for reciprocating said bar to cause it to engage with any depressed key and move the frame in one direction and to engage with said shoulder and move the frame in the other direction.

26. In an adding machine, a plurality of registering disks, key frames for actuating the same, the rear end of each frame being formed into a rack and the forward portion provided with keys and means for locking them in a depressed condition, the intermediate portion of each bar except the central ones, being provided with a downwardly and laterally extending portion forming a shoulder, and a reciprocatory member adapted to engage with the depressed keys and move said frames in one direction and to engage with said shoulders and move the frames in the other direction.

27. In an adding machine, a plurality of registering disks, reciprocatory key frames for actuating the same, the forward end of each frame being provided with depressible keys, and means for locking said frames against reciprocation when more than one key upon the same frame is depressed.

28. In an adding machine, a plurality of registering disks, reciprocatory key frames for actuating the same, and a pivoted plate for locking said frames against reciprocation when more than one key upon one frame is in its depressed position.

29. In an adding machine, a plurality of registering disks, key frames for actuating the same, the forward end of each of which is provided with a projection upon its underside, depressible keys mounted upon said end, a bar for supporting the forward ends of said frame provided with recesses, one for each projection, and a stop adapted to be moved into position relatively to said recesses to prevent the entrance of said projection into said recesses.

30. In an adding machine, a plurality of registering disks, reciprocatory key frames for actuating the same, the forward end of each of which is provided with a projection upon its underside, keys reciprocally mounted upon each of said frames to the rear of said projections, a recessed bar for supporting the forward ends of said frames, a gravity controlled plate pivoted to the bar with its free edge normally below said recesses and adapted to be engaged by the lower end of a depressed key and thereby moved up into position for engaging with said projections and preventing their entrance into their respective recesses when the frames are reciprocated.

31. In an adding machine, a plurality of registering disks, reciprocatory key frames for actuating the same, the forward end of each of which is provided upon its underside with a projection, keys mounted upon each of said frames, the stems of each of which are adapted to be projected below the same, a recessed bar provided with flanged guides for supporting the forward ends of said frames, the flanges at the top being spaced apart for the passage of the key stems, and said recesses being adapted for the passage of said projections, a stop upon said bar for preventing the passage of said projections, and means for engaging with said projections on all normally conditioned frames to the right of a frame on which a key is depressed.

32. In an adding machine, a plurality of registering disks, reciprocatory key frames for actuating the same, the forward end of each of which is provided with a projection, keys on each frame to the rear of said projections, and a draw bar provided with gravity pawls for moving said key frames forward.

33. In an adding machine, a plurality of registering disks, reciprocatory key frames for actuating the same, the forward end of each of which is provided with a projection upon its underside, reciprocatory keys on each frame to the rear of said projection, a draw bar, and gravity pawls pivotally mounted thereon, each pawl being provided with a projection for engaging with and moving the pawl to the right of it when said first-mentioned pawl has been raised.

34. In an adding machine, a series of division plates, pairs of registering disks therebetween, a member on each plate for moving one disk of each pair one step, and means for actuating said member.

35. In an adding machine, a series of division plates, pairs of registering disks therebetween, a reciprocatory member for moving one of the disks of each pair to carry one, and means for moving said member.

36. In an adding machine, a series of division plates, pairs of registering disks therebetween, a reciprocatory member provided with a movable shoulder adapted to move one of the disks of each pair one step when said member is reciprocated, and means for reciprocating said member.

37. In an adding machine, a series of division plates, pairs of registering disks therebetween, a reciprocatory bar on each plate, provided with means for engaging with one of the disks of each pair and rotating it one step, means for actuating said bar, and a lock on each plate adapted to place said bar in condition for being actuated.

38. In an adding machine, a series of division plates, sets of registering disks therebetween, a reciprocatory bar provided with a lever and a movable shoulder, said shoulder being adapted to be moved into engagement with one of said disks and moving it one step, a lock for holding the lever in an inoperative position, means for releasing said lever, and means for moving said shoulder into engagement with said lever to reciprocate the bar.

39. In an adding machine, a series of division plates, sets of registering disks therebetween, a bar provided with a movable shoulder and a lever, a locking lever on each plate, means for actuating the locking lever to cause it to engage with or be disengaged from the other lever, and means for moving the shoulder into engagement with said other lever for reciprocating the bar and moving one of said disks one step.

40. In an adding machine, a series of division plates, a recessed shaft journaled therein, sets of registering disks loosely mounted on said shaft between said plates, one of said disks of each set being provided with a toothed pawl, a locking lever on each plate, one end of which is adapted to be engaged by said pawl, a reciprocatory bar provided with a movable shoulder and a lever, one end of said lever being adapted to be engaged by or disengaged from said locking lever, and means for moving said shoulder and engaging with the free end of said last mentioned lever.

41. In an adding machine, a series of division plates, sets of registering disks therebetween, a reciprocatory bar having each plate provided with a shoulder adapted to be moved into engagement with one of said disks for moving it one step, links for supporting said bar, a spring pressed rod connected with one of said links for returning the bar to its normal position, and means for moving said shoulder and bar.

42. In an adding machine, a series of division plates, sets of registering disks therebetween, a reciprocatory bar for each frame, a pawl pivotally mounted on said bar in position for being moved into engagement with one of said disks, a spring connected to said pawl, and a rotary member for engaging with said spring and for moving said bar longitudinally.

43. In an adding machine, a series of division plates, pairs of registering disks therebetween, means for moving one of the disks of each pair forward one step to carry one, and a series of arms adapted to actuate said carrying mechanism.

44. In an adding machine, a series of division plates, pairs of registering disks therebetween, means for moving one of the disks of each pair forward one step to carry one, and a series of spirally arranged arms for actuating said carrying mechanism in succession.

45. In an adding machine, a series of division plates, pairs of registering disks therebetween, means for moving one of the disks of each pair forward one step to carry one, a series of spirally arranged radiating arms for engaging with said carrying mechanism, a pinion and a pawl for actuating said arms, and a rock shaft provided with a toothed segment for actuating said pinion.

46. In an adding machine, a series of division plates, sets of registering disks therebetween, means for moving one of said disks forward one step to carry one, a shaft provided with a shoulder at one end, a series of spirally arranged radial arms on said shaft, a pinion provided with a pawl for engaging with said shoulder, and a rock shaft provided with a segment for engaging with said pinion, the segment being adapted to give said pinion more than one complete revolution at each actuation of the same.

47. In an adding machine, a series of division plates, a portion of each of which is cut away upon its edge, pairs of registering disks therebetween, a portion of the periphery of each disk being adapted to extend beyond said cut away portion, means for making an impression from the projecting portion of one of the disks of each pair, and means for making an impression from the other disk of said pairs independently of the first impression.

48. In an adding machine, a series of division plates, a portion of the edge of each of which is cut away, pairs of registering disks between said plates, a portion of the periphery of each of which is adapted to extend beyond said cut away portion, the characters on each of said disks being adapted to occupy two positions relatively to said cut away portions, and printing mechanism adapted to be moved toward and from the characters in each of said positions.

49. In an adding machine, a plurality of registering disks, the characters on each of which are adapted to occupy two positions, printing mechanism adapted to be moved toward and from the same, means for moving one of said disks into one position during the process of printing, and into another position after the impression has been made, and means for moving the printing mechanism when an impression is made from the other disks.

50. In an adding machine, a plurality of registering disks, the characters of which are adapted to occupy two positions relatively to each other, and a printing frame adapted to be moved toward and from said disks in two paths.

51. In an adding machine, a plurality of type wheels, the characters of which are adapted to occupy two positions relatively to each other, printing mechanism, hangers for suspending said mechanism, and means for simultaneously actuating the hangers and said mechanism, whereby an impression may be taken from said characters in either position.

52. In an adding machine, a plurality of type wheels, a printing frame, inverted V-shaped hangers, one leg of each of which supports said frame, means connected with the frame for swinging it upon its pivots, and means for engaging with the other leg of the hangers and moving the frame independently of its movement upon its pivots.

53. In an adding machine, a plurality of type wheels, two legged hangers for pivotally suspending said frame, the leg of one of said hangers being bent laterally to form a spring, means for moving the frame laterally against said spring, and means for simultaneously moving the printing mechanism and the hangers.

54. In an adding machine, a plurality of type wheels, two legged hangers, one leg of one hanger being bent laterally to form a spring, a printing frame pivotally mounted in said hangers, one end of which is provided with a projection, an incline adapted to be engaged by said projection, and means for simultaneously moving said frame and said hangers.

55. In an adding machine, a plurality of type wheels, a pivotally mounted printing frame, a reciprocatory bar connected therewith at one end, and means for engaging with said bar at two points for actuating said frame.

56. In an adding machine, a plurality of type wheels, a pivotally mounted printing frame, a reciprocatory bar connected therewith at one end and provided with two shoulders, and means for engaging with either of said shoulders for actuating said frames.

57. In an adding machine, a plurality of type wheels, a pivotally mounted printing frame, a reciprocatory bar connected therewith at one end and provided with shoulders, and two shafts each provided with a projection for engaging with said shoulders.

58. In an adding machine, a plurality of type wheels, a pivotally mounted printing frame, a reciprocatory bar connected therewith at one end and provided with two shoulders, two rock shafts, each provided with a projection for engaging with one of said shoulders, and means for moving said frame bodily when one of said projections actuates said bar.

59. In an adding machine, a plurality of type wheels, a pivotally mounted printing frame, hangers therefor, a reciprocatory shouldered bar connected therewith, rock shafts, each provided with a projection for engaging with said shoulders, a lever for each rock shaft, and a bar connected with one of said levers and with said hangers.

60. In an adding machine, a plurality of type wheels, a pivotally mounted printing frame, two legged hangers therefor, a reciprocatory bar for moving said frame on its pivots, a rock shaft provided with disks and a handle, the handle being provided with a projection for actuating said bar and the disks being adjustable, and a bar connected with the hangers at one end and adjustably connected with said disks at the other.

61. In an adding machine, a plurality of type wheels, a pivotally mounted printing frame, two legged hangers therefor, a reciprocatory bar for moving said frame on its pivots, a rock shaft provided with slotted disks and a handle, the handle being provided with a projection for actuating said bar, and the slots in part of said disks being spiral and in the other disks radial and segmental, means for fastening said disks in an adjusted position, rods connected with the hangers at one end and provided with pins at the other for projecting through the spiral and radial slots.

62. In an adding machine provided with a key board, a plurality of type wheels, a printing frame, a jointed lever for actuating the frame, said joint being provided with shoulders whereby the upper end of the lever may be folded adjacent to the key board of the machine.

63. In an adding machine provided with a key board, a plurality of type wheels, a printing frame, a jointed lever for actuating the frame, the pivoted end of the upper portion of said lever being provided with two shoulders, and the lower portion being provided with a shoulder and a pawl, and means for releasing the pawl when the handle is returned to its normal position, whereby the upper end can be moved down adjacent to the key board of the machine.

64. In an adding machine provided with a key board, a frame, one of the side pieces of which is provided with an inclined slot at its forward end, a plurality of type wheels within the frame, a printing frame, a jointed handle pivotally mounted at the forward end of the frame, the jointed ends of which are shouldered and one of them is provided with a pawl, a pin on said pawl being adapted to enter said slot and cause the pawl to be disengaged from its shoulder and permit the upper end of the handle being turned down adjacent to the key board, the end of said handle being adapted to lock said pawl in position for preventing the movement of said handle while in said turned down position.

65. In an adding machine, a plurality of type wheels, a printing frame provided with a feed roller and a transparent pressure roller, said pressure roller being adapted to engage with the printed side of a sheet of paper after said sheet has received an impression.

66. In an adding machine, a plurality of type wheels, a printing frame provided with a multiple sectioned platen, and a recessed feed roller, each section of the platen registering with one of the recesses of the roller.

67. In an adding machine, a plurality of type wheels, a printing frame provided with a multi-sectioned platen, a recessed feed roller, each section of the platen registering with one of the recesses of the roller and means for automatically moving the roller and platen relatively to each other when an impression is being made.

68. In an adding machine, a plurality of type wheels, a multi-sectioned platen, a recessed feed roller, and means for stopping the forward movement of said roller before an impression is taken.

69. In an adding machine, a plurality of type wheels, a printing frame, a multi-sectioned platen, a recessed feed roller, springs for supporting said roller, and adjustable means for stopping the forward movement of said roller before an impression is taken.

70. In an adding machine, a plurality of type wheels, a printing frame, a recessed feed roller, yoke-like members in said recesses, the forward end of each of which is adapted to form a platen, and means at the rear end for adjustably and yieldingly supporting the same.

71. In an adding machine, a plurality of type wheels, a printing frame, a circumferentially recessed feed roller, yoke-like printing feet in said recesses, a shouldered screw threaded stem for engaging with the rear end of each of said yokes, and a spring for engaging with each shoulder.

72. In an adding machine, a plurality of type wheels, a printing frame, a circumferentially recessed feed roller, a yoke-like printing foot in each recess, the forward end of which is provided with a yielding pad, and the rear end with a shoulder, a shouldered frame adjacent to the rear end of said feet, a shouldered screw-threaded stem in each end and having its rear end angular in cross section and projecting through said frame, and a spring on each stem in engagement with said shoulder.

73. In an adding machine, a plurality of type wheels, a printing frame adapted to be moved toward and from said wheels, a feed roller therein, one end of the shaft of which is provided with a shouldered collar, a movable stop adapted to engage with said shoulders when in one position, and means for moving the stop so that it will not engage with said shoulders.

74. In an adding machine, a plurality of type wheels, a feed roller therein provided with shoulders at one end, a pawl provided with a shoulder in position for being moved into and out of position for engaging with said shoulders, a lock for holding said pawl in its inoperative position, and means for releasing said lock when the frame is moved against said wheels to make an impression.

75. In an adding machine, a plurality of type wheels, a printing frame movable toward and from the same, a feed roller therein provided with shoulders at one end, a shouldered pawl adapted to engage with said shoulders, a hooked bar for locking said pawl in an inoperative position, and a reciprocatory bar connected with said frame for automatically releasing said hook when the printing frame is moved forward to make an impression.

76. In an adding machine, a plurality of type wheels, a printing frame provided with elongated openings at its ends, a feed roller and a pressure roller journaled in said openings, springs for engaging with the shafts of the feed roller, levers for engaging with the shafts of the pressure roller, and springs connected with the free ends of said levers.

77. In an adding machine, a plurality of type wheels, a pivotally mounted printing frame, adapted to be moved vertically and laterally, means for positively moving said frame in one direction, and a spring for returning said frame to its normal position.

78. In an adding machine, a plurality of type wheels, a printing frame movable toward and from said wheels, means for feeding an ink ribbon across said wheels, a shift bar, and a lever for moving the same, the free end of which is provided with means for indicating the direction in which the ribbon is being moved.

79. In an adding machine, a plurality of type wheels, a printing frame movable toward and from said wheels, ribbon mechanism, pawls for controlling said feed, a plate above said ribbon mechanism, a reciprocatory shouldered bar thereon, shoulders on said plate, and a lever pivotally connected with said bar, the pivotal end of which is provided with cam surfaces for engaging with said pins and moving said bar endwise to cause the ribbon to be moved in either direction.

80. In an adding machine, a longitudinally recessed shaft, sets of type wheels loosely mounted thereon, one wheel of each set being provided with a toothed pawl for being engaged by said shaft, a crank for rotating said shaft and returning said wheels to their normal positions, and two movable stops for engaging with said crank and holding it in its normal position.

In testimony whereof we have hereunto set our hands in presence of two subscribing witnesses.

ROBERT H. McNAIR.
WILLIAM A. McNAIR.

Witnesses:
 RUDOLF PFEIFFER,
 ENOS H. CUSHING.